US011958252B2

United States Patent
Mathea

(10) Patent No.: US 11,958,252 B2
(45) Date of Patent: Apr. 16, 2024

(54) METHOD FOR PRODUCING AT LEAST ONE SOLID-BODY LAYER ON A SUPPORT THAT CAN ROTATE ABOUT AN AXIS OF ROTATION

(71) Applicant: dp polar GmbH, Eggenstein-Leopoldshafen (DE)

(72) Inventor: Hans Mathea, Eggenstein-Leopoldshafen (DE)

(73) Assignee: 3D Systems GmbH, Morfelden-Walldorf (DE)

( * ) Notice: Subject to any disclaimer, the term of this patent is extended or adjusted under 35 U.S.C. 154(b) by 383 days.

(21) Appl. No.: 17/604,235

(22) PCT Filed: Apr. 17, 2020

(86) PCT No.: PCT/EP2020/060838
§ 371 (c)(1),
(2) Date: Oct. 15, 2021

(87) PCT Pub. No.: WO2020/212564
PCT Pub. Date: Oct. 22, 2020

(65) Prior Publication Data
US 2022/0203623 A1 Jun. 30, 2022

(30) Foreign Application Priority Data

Apr. 17, 2019 (DE) ...................... 10 2019 002 808.2

(51) Int. Cl.
*B29C 64/393* (2017.01)
*B29C 64/241* (2017.01)
(Continued)

(52) U.S. Cl.
CPC .......... *B29C 64/393* (2017.08); *B29C 64/241* (2017.08); *B29C 64/277* (2017.08);
(Continued)

(58) Field of Classification Search
CPC .... B29C 2043/3466; B29C 2043/3676; B29C 41/04; B29C 41/042; B29C 41/085;
(Continued)

(56) References Cited

U.S. PATENT DOCUMENTS

| 9,751,259 B2 | 9/2017 | Donaldson et al. |
| 10,150,247 B2 | 12/2018 | Dudley |

(Continued)

FOREIGN PATENT DOCUMENTS

| CN | 105479743 A | 4/2016 |
| CN | 106584848 A | 4/2017 |

(Continued)

*Primary Examiner* — Stella K Yi
(74) *Attorney, Agent, or Firm* — The Webb Law Firm

(57) ABSTRACT

In a method for producing at least one solid-body layer on a support that can be rotated about an axis of rotation, in accordance with predetermined geometry data, an emitter array having a plurality of emitters configured as material-dispensing nozzles is provided, which nozzles are arranged in emitter columns and emitter rows. Emitter columns that are adjacent to one another in the circumferential direction of an axis of rotation are offset from one another, in the expanse direction of the emitter columns, in each instance, in such a manner that the emitters are arranged at different radial distances DA(i) from the axis of rotation. It holds true that: DA(i) DA(i+1). Print dots are assigned to the geometry data, which dots are offset from one another, in a matrix having multiple rows that run next to one another, in such a manner that it holds true that: PA(j)>PA(j+1), wherein PA(j) is the radial distance of the $j^{th}$ print dot $P_j$ of the row in question from the axis of rotation. For print dots $P_k$ for which material is supposed to be dispensed onto the support, at least one material portion, in each instance, is dispensed from the emitter $D_k$ of the emitter array assigned to the print dot $P_k$ in question. Dispensing of the material portions takes place in print cycles in which the emitter array is triggered (Continued)

to dispense material once, in each instance, at a trigger point assigned to the print cycle in question, in each instance, and the support as well as the emitter array are offset relative to one another, from print cycle to print cycle, in each instance, by an angular distance with reference to the axis of rotation. Printing of all the print dots of a row takes place in a number of print cycles that is greater than the number of emitter columns. The print cycle is selected, for each print dot to be printed, in each instance, in such a manner that the angular difference between the rotational position of the trigger point of the print cycle and the rotational position in which the print dot to be printed is arranged with reference to the axis of rotation when the support is positioned at the trigger point relative to the emitter array is not greater, in terms of amount, than half the angular distance between the trigger points.

13 Claims, 33 Drawing Sheets

(51) Int. Cl.
- *B29C 64/277* (2017.01)
- *B33Y 10/00* (2015.01)
- *B33Y 30/00* (2015.01)
- *B33Y 50/02* (2015.01)

(52) U.S. Cl.
CPC ............... *B33Y 10/00* (2014.12); *B33Y 30/00* (2014.12); *B33Y 50/02* (2014.12)

(58) Field of Classification Search
CPC ....... B29C 41/26; B29C 45/045; B29C 45/05; B29C 64/241; B29C 64/277; B29C 64/393
See application file for complete search history.

(56) References Cited

U.S. PATENT DOCUMENTS

| | | | |
|---|---|---|---|
| 10,173,350 | B2 | 1/2019 | Hikichi |
| 11,155,036 | B2 | 10/2021 | Mathea |
| 11,602,901 | B2 | 3/2023 | Mathea |
| 2004/0265413 | A1 | 12/2004 | Russell et al. |
| 2013/0189435 | A1 | 7/2013 | Mackie et al. |
| 2013/0264750 | A1 | 10/2013 | Hofacker et al. |
| 2016/0096319 | A1 | 4/2016 | Donaldson et al. |
| 2016/0339724 | A1 | 11/2016 | Munenaka et al. |
| 2017/0003675 | A1 | 1/2017 | Reichle et al. |
| 2017/0173886 | A1 | 6/2017 | Menchik et al. |
| 2018/0111322 | A1 | 4/2018 | Mathea |

FOREIGN PATENT DOCUMENTS

| | | |
|---|---|---|
| CN | 108093627 A | 5/2018 |
| CN | 108136674 A | 6/2018 |
| CN | 109094022 A | 12/2018 |
| DE | 102010041284 A1 | 3/2012 |
| EP | 3321074 A1 | 5/2018 |
| JP | 2017132059 A | 8/2017 |
| JP | 2018517594 A | 7/2018 |
| WO | 2016009426 A1 | 1/2016 |
| WO | 2016180842 A1 | 11/2016 |

| 1 | 2 | 3 | 4 |
|---|---|---|---|
| 000000 | 000000 | AA0000 | BBA000 |
| 000000 | A00000 | BA0000 | CBA000 |
| 000000 | A00000 | BA0000 | CBA000 |
| 000000 | A00000 | BA0000 | CBA000 |
| A00000 | B00000 | CA0000 | DBA000 |

| Fig. 6A | Fig. 6B | Fig. 6C | Fig. 6D |
|---|---|---|---|

| 5 | 6 | 7 | 8 |
|---|---|---|---|
| CCBA00 | DDCBA0 | EEDCBA | FFEDCB |
| DCBA00 | EDCBA0 | FEDCBA | GFEDCB |
| DCBA00 | EDCBA0 | FEDCBA | GFEDCB |
| DCBA00 | EDCBA0 | FEDCBA | GFEDCB |
| ECBA00 | FDCBA0 | GEDCB0 | HFEDCA |

| Fig. 6E | Fig. 6F | Fig. 6G | Fig. 6H |
|---|---|---|---|

| 2 | 3 | 4 | 5 |
|---|---|---|---|
| 000000 | AA0000 | BBA000 | CCBA00 |
| A00000 | BA0000 | CBA000 | DCBA00 |
| A00000 | BA0000 | CBA000 | DCBA00 |
| A00000 | BA0000 | CBA000 | DCBA00 |
| B00000 | CA0000 | DBA000 | ECBA00 |

| Fig. 7A | Fig. 7B | Fig. 7C | Fig. 7D |
|---|---|---|---|

| 6 | 7 | 8 | 1 |
|---|---|---|---|
| DDCBA0 | EEDCBA | FFEDCB | GGFEDC |
| EDCBA0 | FEDCBA | GFEDCB | HGFEDC |
| EDCBA0 | FEDCBA | GFEDCB | HGFEDC |
| EDCBA0 | FEDCBA | GFEDCB | HGFEDC |
| FDCBA0 | GEDCB0 | HFEDCA | IGFEDB |

| Fig. 7E | Fig. 7F | Fig. 7G | Fig. 7H |
|---|---|---|---|

METHOD FOR PRODUCING AT LEAST ONE SOLID-BODY LAYER ON A SUPPORT THAT CAN ROTATE ABOUT AN AXIS OF ROTATION

CROSS-REFERENCE TO RELATED APPLICATIONS

This application is the United States national phase of International Application No. PCT/EP2020/060838 filed Apr. 17, 2020, and claims priority to German Patent Application No. 10 2019 002 808.2 filed Apr. 17, 2019, the disclosures of which are hereby incorporated by reference in their entirety.

BACKGROUND OF THE INVENTION

Field of the Invention

The invention relates to a method for producing at least one solid-body layer on a support that can rotate about an axis of rotation, in accordance with predetermined geometry data.

Description of Related Art

In a method known from US 2004/0265413 A1, geometry data that are stored in a memory as print dots of a Cartesian coordinate system are converted to polar coordinates using a coordinate transformation device. In the method, a 3D printer is provided, which has two emitter arrays, each having multiple emitters arranged at a distance from one another and configured as nozzles that serve to dispense material portions of a liquid material to the support. The support is structured in the form of a circular disk and can be positioned rotationally relative to the emitter array, about an axis of rotation, using a drive. Using an encoder, a rotational position signal is generated for the relative position between the emitter arrays and the support.

Furthermore, the support can be positioned in the vertical direction relative to the nozzle array. In this way, it is possible to lower the support during the printing process, per revolution, relative to the nozzle array, by the thickness of the material layer last applied, in each instance, so as to apply a further material layer to this material layer and to thereby produce a shaped object, layer by layer.

Each emitter array has a plurality of commercially available print heads that can be incrementally displaced on a print-head carrier, radially relative to the axis of rotation, which carrier is arranged on a slide guide. In this way, irregularities during printing, which can be caused by non-functioning print heads, misfiring or incorrectly positioned emitters, can be corrected in that the position of the emitter array is changed from layer to layer. Errors that are caused by misfiring of an emitter are thereby arranged at different locations in the individual printed layers and are averaged. Furthermore, the emitter arrays can be arranged, using the print-head carriers, between a printing position, in which the emitters are arranged above the support, a diagnosis position, in which the emitters are positioned on a diagnosis device situated next to the support, and a service position, in which the emitters are positioned next to the support and next to the service position. In the service position, the emitters can be cleaned or replaced.

It is not disclosed in the published patent application, in any greater detail, how precisely the emitters of the emitter arrays are arranged and how they are controlled during printing.

Furthermore, a 3D printer is known from practice, which has a holder on which an approximately rectangular support that extends in the horizontal plane is arranged, to hold a shaped object to be produced by means of layer-by-layer material application. The printer serves for printing the shaped object in a Cartesian coordinate matrix. For the shaped object, geometry data are provided, which are assigned to print dots that lie in a Cartesian coordinate matrix.

Above the support, a print head is arranged on the holder, which head has a nozzle arrangement for dispensing material portions of a material capable of flow into the support, which arrangement will also be referred to as an emitter array hereinafter. The emitter array has a plurality of emitters configured as nozzles, which are arranged in matrix form in emitter columns offset parallel to one another and emitter rows offset parallel to one another and running transverse to the emitter columns, in an oblique-angled, straight-line coordinate system. Emitter columns that are adjacent to one another are offset relative to one another in the expanse direction of the emitter columns, in each instance, wherein the offset is less than the offset that the emitters have in the emitter columns. The emitter columns run parallel to the two short edges of the rectangular support (X axis). The emitters are arranged in such a manner that each emitter of the emitter array lies at a different X position of the Cartesian coordinate matrix, in the direction that runs parallel to the two short edges of the rectangular support. In this regard, precisely one emitter of the emitter array is assigned to every X position of the coordinate matrix, in each instance.

The emitter array can be displaced in the Y direction, parallel to the longitudinal expanse of the support, by means of a first positioning device arranged on the holder, and can be moved back and forth between the two short edges, which are spaced apart from one another. Since print dots that are directly adjacent to one another and lie on a line that runs parallel to the two short edges of the rectangular support, in the direction of the X axis, are printed using nozzles that are arranged in different emitter columns of the emitter array, the print head is positioned at different X positions during printing of the print dots of the line that lie adjacent to one another, in such a manner that the offset that the different emitter columns have in the direction of the X axis is compensated. As a result, print dots that are arranged directly next to one another in the X direction can be printed onto the support so closely offset from one another that they overlap in certain regions. Nevertheless, the emitters of the emitter array are spatially separated from one another and spaced apart from one another to such an extent that channels can be provided between the emitters, which channels connect the emitters with a reservoir for the material that passes through the nozzles, and/or electrical conductor tracks can be provided.

The emitters of the emitter array can be moved relative to the support, together with the reservoir for the material that passes through the nozzles. A fixation device is provided adjacent to the print head, which device has an ultraviolet light source for cross-linking or solidification of the material layer applied using the emitter array. The fixation device can be moved relative to the support, together with the print head.

The previously known 3D printer furthermore has a second positioning device, by means of which the support can be moved normal to the plane in which the support extends, toward the print head and away from it, in other words it can be positioned in terms of height.

For the production of a shaped object, the print head is positioned adjacent to the first edge of the support, at a predetermined distance above it. From a data memory in which geometry data for the shaped object to be produced are stored, data for the geometry of a first material layer are loaded into a fast print buffer. Afterward, the print head is continuously moved toward the opposite second edge of the support, using the first positioning device. At the same time, a material portion is dispensed onto the support at the locations where a first material layer of the shaped object is supposed to be formed, in each instance, by means of corresponding control of the individual emitters of the emitter array. Control of the individual emitters takes place as a function of the current position of the print head and as a function of the data contained in the print buffer. The material capable of flow that is applied to the support in this manner is solidified by means of irradiation with ultraviolet light, which is generated using the fixation device.

When the print head has arrived at the second edge of the support, the horizontal advancing movement of the print head is stopped, and geometry data for a further material layer to be applied to the previously produced material layer are loaded into the print buffer. Furthermore, the support is lowered, using the second positioning device, by a dimension that corresponds to the thickness of the previously produced material layer, so as to apply a further material layer to this material layer. Now the print head is continuously moved toward the first edge of the support, using the first positioning device. At the same time, a material droplet is dispensed onto the material layer that has already been completed, in each instance, by means of corresponding control of the emitters at the locations at which the further material layer is to be formed. The polymer material capable of flow that is applied to the support in this manner is once again solidified by means of irradiation with ultraviolet light, which is generated using the fixation device.

The method has the disadvantage that time is needed for stopping and accelerating the print-head module with its accessories at the edges of the support, and this time cannot be used for printing. This stopping and acceleration can take up as much as 50% of the total printing time in the case of smaller to medium-size printed surfaces, and therefore can significantly reduce the productivity of the method. Furthermore, the heavy print head and the relatively large and heavy parts connected with it, such as the reservoir with the supply of material capable of flow contained in it, the cable carriers, which are susceptible to wear, and the fixation device must be stopped after every completion of a material layer, and—if a further material layer is supposed to be applied—accelerated in the opposite direction. The mechanical parts of the positioning devices are subjected to stress as the result of the acceleration forces that occur in this connection, and this leads to corresponding wear of the bearings and guides of the positioning devices, and thereby impairs the precision of the printer.

The task therefore exists of indicating a method of the type stated initially, which makes it possible to rapidly produce at least one solid-body layer, in a simple manner, in accordance with geometry data stored in a memory, by means of an emitter array in which the emitters are arranged in an oblique-angled, straight-line coordinate system. Furthermore, the method is supposed to make it possible to apply individual radial lines composed of a plurality of print dots that are closely adjacent to one another and/or overlap in certain regions, which dots are supposed to be printed in accordance with the geometry data, to the support in an acceptable print quality. Finally, it is also supposed to be possible to carry the method out in a cost-advantageous manner.

SUMMARY OF THE INVENTION

This task is accomplished as described herein. These characteristics provide a method for producing at least one solid-body layer on a support that can be rotated about an axis of rotation, in accordance with predetermined geometry data, a) wherein for dispensing material portions of the material that can pass through the nozzles, onto a support, an emitter array having a number of N emitters configured as material-dispensing nozzles is provided, which are arranged in matrix form, in emitter columns offset parallel to one another, and emitter rows that run transverse to the emitter columns and are offset parallel to one another, wherein emitter columns that are adjacent to one another in the circumferential direction of the axis of rotation are offset from one another, in the expanse direction of the emitter columns, in each instance, in such a manner that the individual emitters of the emitter array are arranged at different radial distances $DA(i)$ from the axis of rotation, wherein it holds true that:

$DA(i) > DA(i+1)$ where $i \in [1 \ldots (N-1)]$ b) wherein print dots ($P_M \ldots P_{M+N}$) are assigned to the geometry data, which dots are arranged in a matrix having multiple rows that run next to one another, in which a number of Q print dots is arranged, in each instance, are offset from one another in a manner such that the following holds true:

$PA(j) > PA(j+1)$, where $j \in [M \ldots (M+N-1)]$ and $1 \leq M \leq Q-N$,
wherein $PA(j)$ is the radial distance of the $j^{th}$ print dot $P_j$ of the row in question from the axis of rotation, and M is a whole number, c) wherein for print dots $P_k$, for which material is supposed to be dispensed onto the support, at least one material portion, in each instance, is dispensed from the emitter $D_k$ of the emitter array assigned to the print dot $P_k$ in question, wherein k is a whole number between M and M+N−1, d) wherein dispensing of the material portions takes place in print cycles, in which the emitter array is triggered to dispense material once, in each instance, at a trigger point assigned to the print cycle in question, and the print support as well as the emitter array are offset relative to one another, from print cycle to print cycle, in each instance, by an angle distance with reference to the axis of rotation, e) wherein printing of all the print dots $P_M \ldots P_{M+N}-1$ of a row to be printed takes place in a number of print cycles that is greater than the number of emitter columns, f) wherein the print cycle for each print dot to be printed is selected in such a manner, in each instance, that the angular difference between the rotational position of the trigger point of the print cycle and the rotational position in which the print dot to be printed is arranged with reference to the axis of rotation, when the support is positioned at the trigger point relative to the emitter array, is not greater, in terms of amount, than half the angular distance between the trigger points.

The task stated above is also accomplished as described herein. These characteristics provide a method for producing at least one solid-body layer on a support that can be rotated about an axis of rotation, in accordance with predetermined geometry data, a) wherein a container is provided, in which at least one material layer composed of a liquid, paste-like or powder-form material is applied to a support, wherein for irradiation of the material with a radiation that solidifies the material, an emitter array having a number of N radiation emitters, spaced apart from one another, facing the material layer, is provided, which emitters are arranged in matrix form, in emitter columns offset parallel from one another, and emitter rows offset parallel from one another and running transverse to the emitter columns, wherein emitter columns that are adjacent to one another in the circumferential direction of the axis of rotation are offset relative to one another in the expanse direction of the emitter columns, in each instance, in such a manner that the individual emitters of the emitter array are arranged at different radial distances DA(i) from the axis of rotation, wherein it holds true that:

$$DA(i) > DA(i+1)$$

where $i \in [1 \ldots (N-1)]$ b) wherein print dots are assigned to the geometry data, which dots are arranged in a matrix having multiple rows that run next to one another, in which a number of Q print dots is arranged, in each instance, offset from one another in such a manner that it holds true that:

$$PA(j) > PA(j+1),$$

where $j \in [M \ldots (M+N-1)]$ and $1 \leq M \leq Q-N$,
wherein PA(j) is the radial distance of the $j^{th}$ print dot $P_j$ of the row in question relative to the axis of rotation, and M is a whole number, c) wherein for print dots $P_k$, at which the solid-body layer is supposed to be present, radiation is emitted to the material, from the emitter $D_k$ of the emitter array assigned to the print dot $P_k$ in question, in each instance, wherein k is a whole number between M and M+N−1, d) wherein the irradiation of the material takes place in print cycles, in which the emitter array is triggered for irradiation once, in each instance, at a trigger point assigned to the print cycle in question, and the support as well as the emitter array are offset relative to one another, from print cycle to print cycle, in each instance, by an angular distance with reference to the axis of rotation, e) wherein printing of all the print dots $P_M \ldots P_{M+N-1}$ of a row to be printed takes place in a number of print cycles that is greater than the number of emitter columns, f) wherein the print cycle for each print dot to be printed is selected in such a manner, in each instance, that the angular difference between the rotational position of the trigger point of the print cycle and the rotational position in which the print dot to be printed is arranged with reference to the axis of rotation when the support is positioned at the trigger point, relative to the emitter array, is not greater, in terms of amount, than half the angular distance between the trigger points.

According to the invention, therefore, every print dot to be printed is assigned to an emitter and a print cycle, in each instance. Assignment of the emitter takes place, in this regard, in such a manner that an emitter is assigned to the print dot in question, in each instance, in which emitter the radial distance between the centroid of the exit opening of the emitter, for example, and the axis of rotation agrees with the radial distance of the print dot from the axis of rotation—or, if such an emitter is not present—the emitter in which the radial distance between the centroid of the exit opening of the emitter, for example, and the axis of rotation agrees as well as possible with the radial distance of the print dot from the axis of rotation, is assigned to the print dot.

Assignment of the print cycle to the print dot takes place in such a manner that the rotational position of the trigger point at which the material portion for the print dot is dispensed onto the support, by means of the emitter, in the case of the solution as described herein, or, in the case of the solution as described herein, the trigger point at which the liquid, paste-like or powder-form material situated in the container is irradiated, and the rotational position of the print dot to be printed agree—or, if such a trigger point is not present—the trigger point having a rotational position that agrees as well as possible with the rotational position of the print dot to be printed is assigned to the print dot. By means of these measures, it is made possible that individual radial lines to be printed are perceived by the human eye as individual radial lines after printing. In particular, it is prevented that individual radial lines are perceived by the human eye as V shapes or as multiple lines.

Although the support and the nozzle array rotate relative to one another about the axis of rotation during printing, which corresponds to printing in a polar coordinate matrix, a print head that is actually intended for printing in a Cartesian coordinate matrix is used as the nozzle array. Such a print head, in which the emitters are arranged in an oblique-angled, straight-line coordinate matrix, has the advantage, as compared with a print head in which the emitters are arranged in a polar matrix, that it is inexpensively commercially available as a mass-produced component. Therefore the method according to the invention can be carried out in a cost-advantageous manner, and nevertheless the method allows high print quality, at least when printing lines arranged radially relative to the axis of rotation.

A print dot is understood to be a location at which at least one material portion is dispensed onto the support, if corresponding geometry data are present and, if applicable, further conditions are met, in the case of the solution as described herein or, in the case of the solution as described herein, the liquid, paste-like or powder-form material is irradiated. Thus, for example in the case of the solution as described herein, it can be practical to provide a greater angular distance between material-dispensing locations that are adjacent to one another, in a region of the support that is arranged close to the axis of rotation, than in a region that is farther away from the axis of rotation. The greater angular distance can also be achieved in that in the region first mentioned, not all of the print dots are printed. By means of these measures, the material can be printed with approximately the same layer thickness in regions of the support that are at different distances from the axis of rotation. A corresponding method for this is described in WO 2016/180842 A1.

The geometry data are preferably stored as a bitmap and can have a material-dispensing value for each print dot in the case of the solution as described herein. In the simplest case, the material-dispensing value can have two states, for example the logical value "1" if at least one material portion is supposed to be applied to the support at the print dot, and the logical value "0" if no material is supposed to be applied at the print dot. If different material amounts are supposed to be applied to the support for the individual print dots, the material-dispensing value can also comprise more than two states. If necessary, the geometry data can also have coordinates for positions of the print dots. It is also conceivable that coordinates are provided only for those print dots at which material is supposed to be applied to the support. In this case, a material-dispensing value can be eliminated.

In one embodiment of the invention, the matrix is a Cartesian matrix, and the rows in which the print dots are offset relative to one another run parallel to one another. In this embodiment of the method, individual radial lines to be printed are printed in such a manner that after printing, they are perceived by the human eye, from a greater distance, as individual radial lines. In the case of straight lines that do not run radially, distortions can occur in the form of curvatures. Thus, for example, straight lines that are arranged at a right angle to lines that are oriented radially relative to the axis of rotation and run parallel to the support are printed as circular lines that are concentric to the axis of rotation.

In a preferred embodiment of the invention, the matrix is a polar matrix, and the rows in which the print dots are offset from one another are arranged radially relative to the axis of rotation, wherein preferably, rows that are adjacent to one another are offset from one another, in each instance, by the angular distance of the trigger points. In this regard, it is even possible that the print dots are at first arranged in a Cartesian matrix and then converted to the polar matrix. In this way, good agreement is achieved between the position of the print dot to be printed, provided in accordance with the geometry data, and the location at which the material portion for the print dot is applied to the support, using the nozzle. In other words, the solid-body layer can be printed in a low-distortion manner.

It is practical if, for a number of trigger points that directly follow one another, which number corresponds to the number of print cycles, a print cycle is assigned to the print dot $P_M \ldots P_{M+N-1}$ in question, in each instance, for the trigger point in question, for every print dot $P_M \ldots P_{M+N-1}$ that the emitter array is set up to print, wherein afterward, in accordance with this assignment, a print cycle is assigned, for the individual rows, in each instance, to each print dot $P_M \ldots P_{M+N-1}$ to be printed, which the emitter array is set up to print, and the emitter array is triggered, in each instance, when the trigger point assigned to the print cycle in question is reached. The assignment of the print dots to the print cycles therefore has to be determined only for a number of print dot rows that corresponds to the number of print cycles, and can then be used for all further rows that have print dots. The assignment of the print cycles to the print dots can take place by means of a hardware circuit. However, it is also conceivable to carry out the assignment by means of an operating program that runs on a microcomputer or a similar controller.

In a further development of the invention, it is provided
  a) that a data memory is provided, in which the geometry data are stored,
  b) that a ring memory is provided, which has at least a number of memory spaces that corresponds to the number of print cycles, which locations comprise a number of memory spaces that correspond, in each instance, to the number (N) of the emitters of the emitter array, each of which locations is assigned, in each instance, to an emitter,
  c) that for a number of directly consecutive print cycles that corresponds to the number of print cycles, one of the memory spaces, in each instance, is assigned to each of these print cycles,
  d) that for a first row of print dots stored in the data memory, a number of print dots that the emitter array is set up to print, corresponding to the number of the emitters of the emitter array, is read out from the data memory,
  e) that an activation value is stored, in each instance, for the emitter assigned to the print dots of the first row, in the memory spaces of the ring memory assigned to the emitters, which value indicates whether the emitter assigned to the print dot in question is supposed to be activated in the print cycle assigned to the memory space in question,
  f) that for a further row, geometry data for a number of print dots, which the emitter array is set up to print, corresponding to the number (N) of the emitters of the emitter array, are read out from the data memory,
  g) that an activation value is stored, in each instance, for the emitters assigned to the print dots of the further row, in the memory spaces of the ring memory assigned to the emitters, which value indicates whether the emitter assigned to the print dot in question is supposed to be activated in the print cycle assigned to the memory space in question,
  h) that the steps f) and g) are repeated until a number of print dots corresponding to the number of emitters (N), in each instance, has been read out of the data memory for a number of rows corresponding to the number of print cycles, and corresponding activation values for these print dots have been stored in the ring memory,
  i) that the support and the emitter array are positioned relative to one another, at the trigger point (A to H) assigned to the print cycle in the memory space of which activation values were first stored, and the emitters of the emitter array are controlled as a function of the activation values stored in this memory space,
  j) that in the event that at least one further print dot remains to be printed,
    the memory spaces are cyclically interchanged, in such a manner that the memory space to which the trigger point (A to H) is assigned, at which the support and the emitter array were last positioned relative to one another for triggering the emitters, is the first memory space, and afterward
    the steps f) to j) are repeated.

The method can thereby be carried out in a simple manner and so as to save storage space.

It is practical if the emitter array has a print buffer assigned to it, in which a memory space is provided for each emitter of the emitter array, in each instance, wherein in each print cycle, an activation signal is stored for each emitter, in each instance, as a function of the geometry data, in the memory space of the print buffer assigned to the emitter in question, and wherein the emitter array is afterward triggered in the print cycle, in such a manner that the individual emitters are controlled as a function of the activation signal stored in the memory space assigned to them. In this way, it is ensured that all the emitters that are supposed to be activated are turned on simultaneously when the trigger occurs.

In a preferred embodiment of the invention, at least a first and a second emitter array are provided for printing of print rings arranged concentrically to the axis of rotation, each delimited by an inner and an outer circular path, wherein these emitter arrays are positioned relative to the axis of rotation in such a manner that the arithmetical average value of the inner and the outer circular path of the first emitter array differs from the arithmetical average value of the inner and the outer circular path of the second emitter array, and wherein a different number M is assigned to the first emitter array than to the second emitter array. The support can therefore also be simultaneously imprinted with two or more emitter arrays, arranged at different distances from the axis of rotation. In this case, the individual emitter arrays are preferably structured as a module or print head, in each instance. In this regard, it is even possible to assign each print head its own print buffer, in each instance. Since the rows and columns of the individual emitter arrays run parallel to one another, in each instance, the emitter arrays or print heads that are assigned to the different print rings can have the same construction, in contrast to a polar printing apparatus, in which the emitters are offset from one another on rays arranged radially relative to the axis of rotation. This makes it possible to carry the method out in a simple and cost-advantageous manner. If a corresponding number of print heads is present, a support that can have a surface of almost any large size can be imprinted. Preferably print rings arranged adjacent to one another border on one another or overlap slightly, in such a manner that in the radial direction, gap-free imprinting of the support is possible.

It is advantageous if the emitter columns of the emitter array are arranged symmetrically relative to a radial plane that passes through the axis of rotation and a normal line to the axis of rotation, in such a manner that the emitter columns run parallel to this radial plane. If the emitter array has an odd number of emitter columns, the arrangement of the emitter columns is preferably such that the center emitter column or its straight extension runs through the axis of rotation. If the print head array has an even number of emitter columns, the axis of rotation is preferably arranged centered between the two innermost emitter columns or their straight extensions.

In another advantageous embodiment of the invention, at least two emitter arrays are provided, which are offset relative to one another with reference to the axis of rotation by a rotational angle, wherein the emitters of the individual emitter arrays are controlled, in each instance, for application of material portions, as described herein. In this way, the support can be imprinted. Using the individual emitter arrays, different materials can be applied to the support in the case of the solution as described herein. In this regard, the emitter arrays are preferably arranged at the same distance from the axis of rotation. However, it is also possible to apply the same material to the support using the emitter arrays that are offset from one another by a rotational angle, with reference to the axis of rotation. In this regard, the radial distances between the emitter arrays and the axis of rotation can be selected in such a manner that the support can be coated with the material without interruptions in the radial direction.

Preferably the emitters that are adjacent to one another within the emitter columns are offset from one another at a constant first raster distance, wherein emitter columns that are adjacent to one another are offset relative to one another at a constant second raster distance, in each instance, and wherein the first raster distance deviates by less than 20 percent, in particular by less than 10 percent, from the product of the number of emitter columns and the second raster distance, and, in particular, agrees with this product. In this way, distortions during printing can be further reduced.

Using the method according to the invention, it is possible to produce three-dimensional shaped objects. For this purpose, in the case of the method in which the material is applied using nozzles, multiple material layers of the material that passes through the nozzles are applied, one on top of the other, wherein the distance between the nozzle array and the support is increased from layer to layer, in each instance, by the thickness of the material layer last applied, and each material layer is solidified, in each instance, after having been applied, before a further material layer is applied. If the material is a cross-linkable polymer material, solidification of the material can be achieved, for example, in that it is irradiated with UV light having a suitable wavelength. In the case of the method as described herein, multiple material layers of the liquid, paste-like or powder-form material are solidified over their full area and/or in certain regions, one on top of the other, so as to produce a three-dimensional shaped object, by means of irradiation with the emitter array. The method allows rapid and interruption-free application of a plurality of material layers.

BRIEF DESCRIPTION OF THE DRAWINGS

In the following, exemplary embodiments of the invention are explained in greater detail using the drawing. This shows.

DESCRIPTION OF THE INVENTION

Figure 1:
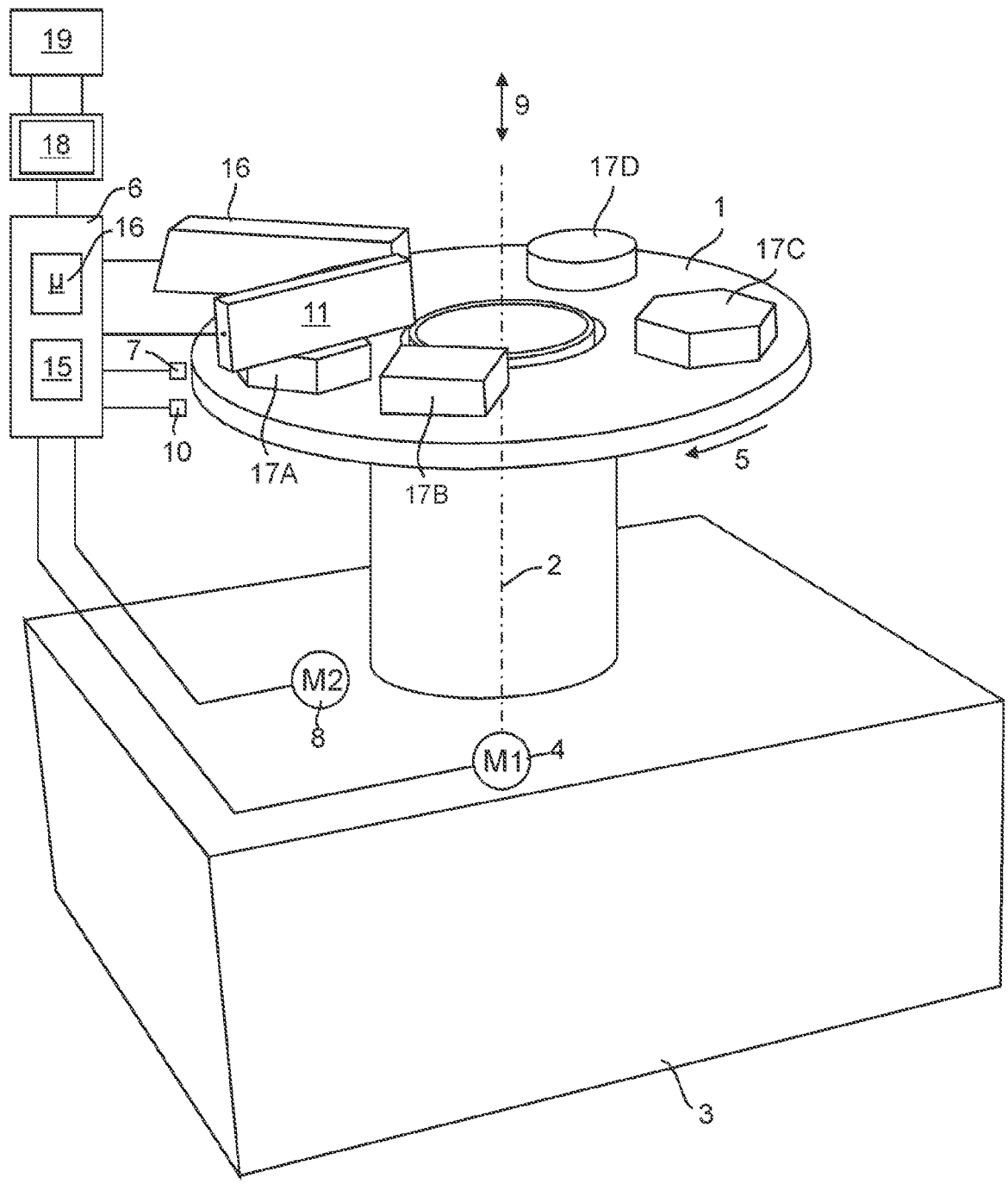
FIG. 1 an apparatus for layer-by-layer production of three-dimensional solid-body shaped objects by means of application of material that passes through the nozzles, wherein the apparatus has a support that can be rotated about an axis of rotation, onto which support a number of material layers for the shaped objects have been applied, FIG. 2 a representation similar to FIG. 1, after further material layers were applied and the support was lowered as compared with FIG. 1, FIG. 3 a schematic top view of an emitter array structured as a print head, which array comprises multiple emitters structured as nozzles and arranged in rows and columns, in matrix form, wherein the position of the individual exit openings of the emitters is indicated, in each instance, by a circle, and the rows in which the exit openings are arranged are marked by means of straight lines that run parallel to one another, FIG. 4 a graphic representation of print dots that define a layer of a polar matrix of a model of the three-dimensional shaped object, wherein the print dots lie in rows A to I that are arranged radially relative to the axis of rotation, and wherein multiple print dots, in each instance, are arranged in each row, FIG. 5A to 5I representations similar to FIG. 3, which show the emitter array positioned above the support to be imprinted, during printing of the print dots shown in FIG. 4, wherein the support is rotationally positioned, in FIG. 5A to 5I, at different trigger points relative to the emitter array, and wherein the rows of the matrix are indicated, corresponding to FIG. 4, with letters A to I, FIG. 6A to 6H a schematic representation of the memory contents of a ring memory, which contents are assigned to the individual trigger points, and in which memory activation values for the individual emitters of the emitter array are stored, wherein the letters A to I refer to the rows of the matrix on which the print dot lies, which dot is supposed to be printed with the emitter in question, wherein letters A to I, which are emphasized with bold print, indicate that the emitter in question is supposed to be activated at the trigger point in question, and wherein letters E, 0, which are not in bold print, indicate that the emitter in question is not supposed to be activated at the trigger point, FIG. 7A to 7H the content of the ring memory after cyclical replacement of the memory contents of the ring memory shown in FIG. 6A to 6H, and overwriting of the memory content first read into the ring memory, in accordance with FIG. 6A, with activation values for a further trigger point, FIG. 8A to 8H a representation similar to FIG. 5A to 5H, wherein, however, the full-area black circles mark the locations at which a partial region of the shaped object was produced, in accordance with the memory content of the ring memory, in the current print cycle shown in the figure or a previous print cycle, upon triggering of the emitter array, and wherein the circular lines mark locations at which no partial region of the shaped object was produced, FIG. 9 a flow diagram that clarifies the steps that occur during processing of geometry data for the shaped object and during control of the emitter array, FIG. 10 the line indicated with "A" in FIG. 4, which was printed using the apparatus shown in FIGS. 1 and 2, wherein partial regions of the shaped object produced on the support to be imprinted are shown by means of full-area black circles, and the locations at which the partial regions of the shaped object are supposed to be applied to the support, in accordance with the geometry data used for printing of the line "A", are marked with circular lines, FIG. 11 a graphic representation of geometry data present in a Cartesian matrix, FIG. 12 the print result when the geometry data from FIG. 11 were printed using the method according to the invention, FIG. 13 the print result when the geometry data from FIG. 11 were printed using a method not according to the invention, in which the number of print cycles corresponds to the number of nozzle columns, FIGS. 14 and 15 partial top views of the support of an apparatus for layer-by-layer production of three-dimensional shaped objects, wherein the support has multiple emitter arrays that are assigned to different print rings, FIG. 16 an apparatus for producing three-dimensional shaped objects in accordance with the stereolithography model, wherein the apparatus has a container in which a support that can rotate and a material that can be solidified by means of irradiation with electromagnetic radiation are arranged, FIG. 17 a longitudinal section through the axis of rotation of the apparatus shown in FIG. 16, and FIG. 18 a representation similar to FIG. 17, after further material layers were solidified and the support was lowered as compared with FIG. 17.
Figure 2:
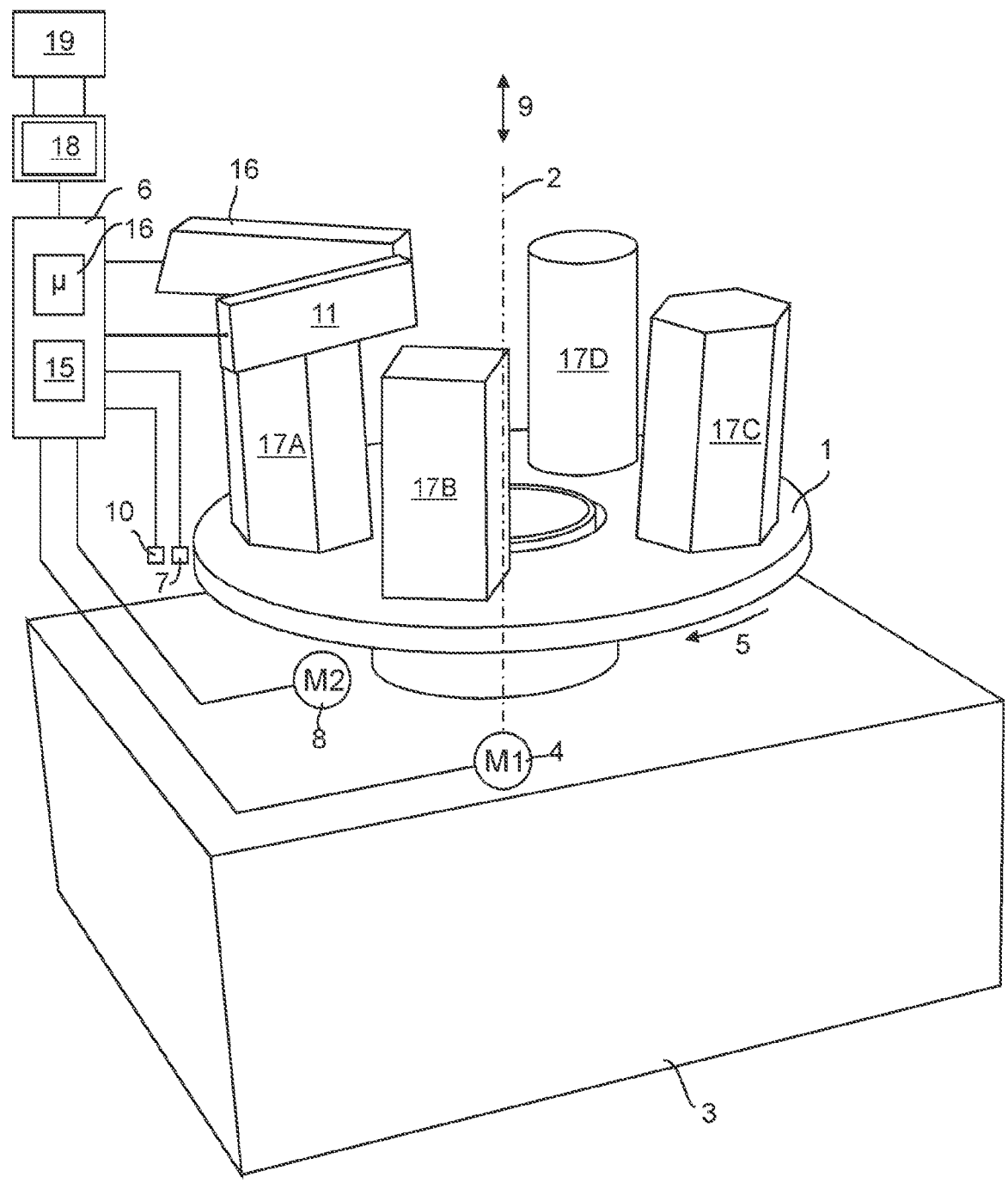

In the case of a method for layer-by-layer production of a solid-body shaped object on a support 1 that can be rotated about an axis of rotation 2, in accordance with predetermined geometry data, a rotary disk in the shape of a circular ring, which has the support 1, is provided, which disk is mounted so that it can be rotated about a vertical axis of rotation 2, on a holder 3 that is fixed in place (FIGS. 1 and 2). The holder 3 has a standing surface on its underside, by means of which it can be set up on a tabletop or on the floor of a room, for example.

The support 1 stands in a drive connection with a first positioning device that has a first drive motor 4, by means of which the support 1 can be driven to rotate in the direction of the arrow 5 and can be positioned in accordance with a rotational position reference value signal that is provided by a control device 6. For this purpose, the first drive motor 5 is connected with a first position regulator integrated into the control device 6, which regulator has an encoder 7 for detecting a rotational position signal for the support 1. Using the first positioning device, it is possible to rotate the support 1 about the axis of rotation 2 continuously and without stopping, over almost any desired angles of more than 360° relative to the holder 3.

The support 1 furthermore stands in a drive connection with a second positioning device that has a second drive motor 8, by means of which the support 1 can be displaced up and down relative to the holder 3, in the direction of the double arrow 9, and can be positioned in accordance with a height position reference value signal provided by the control device 6 (FIGS. 1 and 2). This positioning can take place step by step or continuously. For this purpose, the second drive motor 10 is connected with a second position regulator that is integrated into the control device 6, which regulator has a position sensor 10 for detecting the height position of the support 1.

To carry out the method, an emitter array 11 is furthermore provided, which is structured as a print head that has a plurality of 30 emitters 12 provided with controllable valves or pumps, which are structured as material-dispensing nozzles, from which material portions (for example droplets) of a curable material that can pass through the nozzles can be dispensed. In place of a print head, a different emitter matrix having fixed emitters can also be used. The material can be, for example, a polymer that can be cross-linked with light, which is kept on hand in a reservoir not shown in any detail in the drawing, which reservoir is connected with the emitters 12 by way of lines.

The exit openings of the emitters 12 are arranged above the support 3, in a plane that runs parallel to the plane of the support 1 and is arranged at a distance from it, and are positioned relative to one another in matrix form, in multiple emitter columns 13 arranged parallel to one another as well as emitter rows 14 that are offset relative to one another and run transverse to the emitter columns 13. Multiple emitters 12 are arranged, in each instance, in each emitter column 13 and each emitter row 14.

Figure 3:
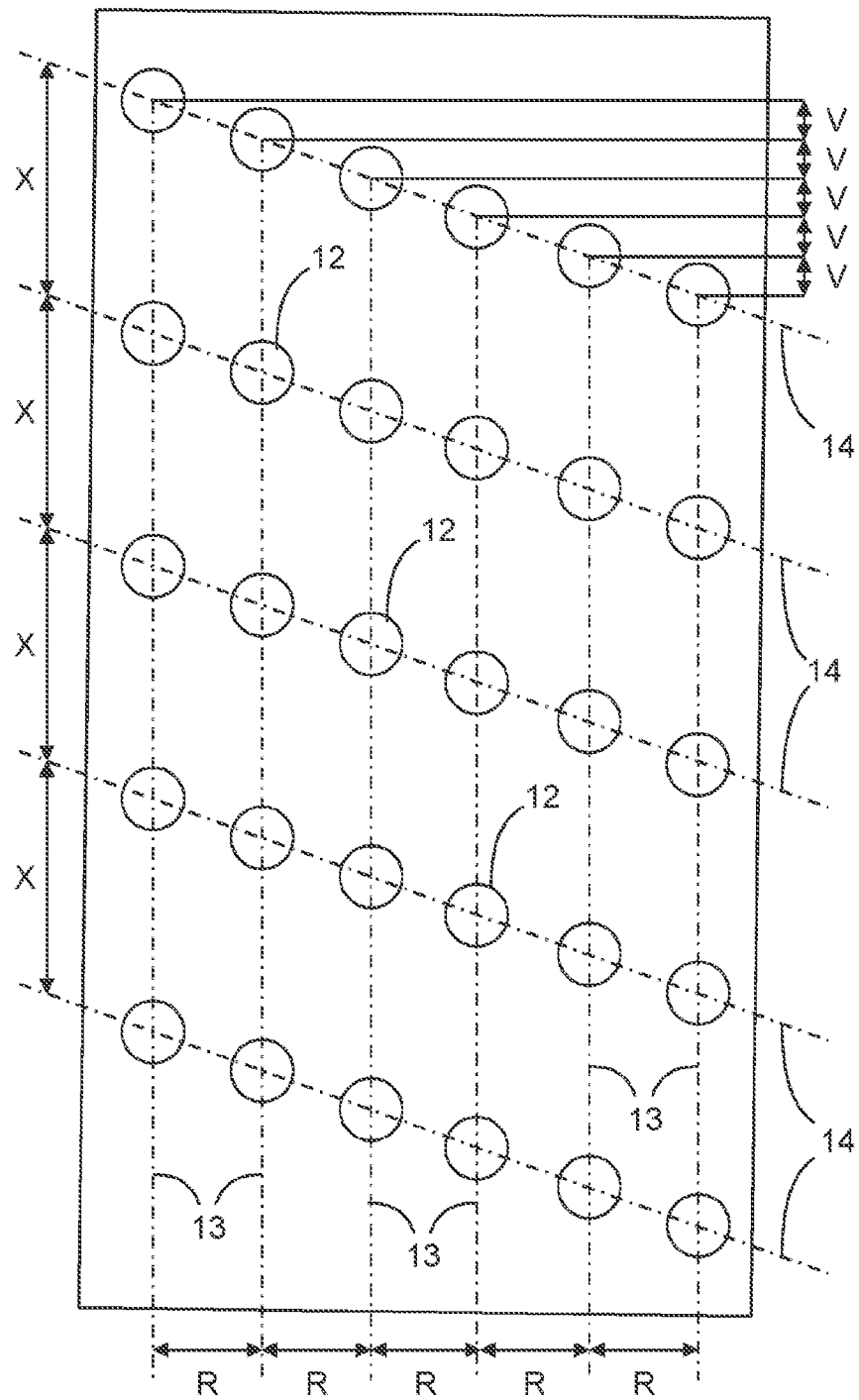

In the emitter columns 13, the centroids of the exit openings of the individual emitters 12 are offset relative to one another along straight lines that run parallel to and are spaced apart from one another, at constant distances X (FIG. 3). Emitter columns 13 that are adjacent to one another in the circumferential direction of the axis of rotation 2 are offset from one another, in each instance, in the expanse direction of the emitter columns 13, by an offset V. The offset V is selected in such a manner that the individual emitters 12 of the emitter array 11 are arranged at different radial distances $DA(i)$ from the axis of rotation 2. For the radial distances, the following holds true:

$$DA(i) > DA(i+1), i \in [1 \ldots 29]$$

Therefore the first emitter 12 has the greatest distance from the axis of rotation 2, and the thirtieth emitter 12 has the smallest distance from the axis of rotation 2.

The emitter array 11 is connected with a print buffer 15 in which an activation signal can be temporarily stored for each emitter of the emitter array 11, in each instance. The activation signal can have the logical value "1" or the logical value "0", for example.

Furthermore, the emitter array 11 has a trigger input to which a trigger signal can be applied. For every trigger that is received at the trigger input, all the emitters 12 of the emitter array 11 for which the activation value "1" is stored in the printer buffer 15, in each instance, dispense a material portion. Emitters 12 for which the activation value "0" is stored in the printer buffer are not activated when a trigger is received, i.e. these emitters 12 do not dispense a material portion.

A UV light source 16 is provided for solidification or for cross-linking of a material layer applied to the support 1, to a material layer situated on it and/or to a layer stack situated on the support 1, having multiple material layers applied by means of the emitter array 11, which source is positioned at the support 1 in such a manner that it faces the support 1 with its emission side.

Using the apparatus that has the support 1, the emitter array 2, the control device 6, and the UV light source 16, it is possible to produce three-dimensional shaped objects 17A, 17B, 17C, 17D on the support 1 by means of layer-by-layer application and solidification of a plurality of material layers of the material that passes through the nozzles.

The control device 6 is connected with an overriding computer 18, such as, for example, a PC, which has a data memory 19 in which geometry data are stored for the individual material layers. Print dots are assigned to the geometry data, which dots are arranged in a polar matrix that has multiple rows 20 that run next to one another, in each instance, the straight extension of which intersects the axis of rotation 2, in each instance. Rows 20 that are adjacent to one another in the circumferential direction of the axis of rotation 2 are offset from one another, in each instance, at an angular distance W. In each row 20, in each instance, a number of 30 print dots is provided, which are offset from one another in such a manner that the following holds true for the radial distance PA(j) of the $j^{th}$ print dot $P_j$:

$$PA(j) > PA(j+1), \text{ where } j \in [1 \ldots 29]$$

The first print dot $P_1$ therefore has the greatest distance from the axis of rotation 2, and the thirtieth print dot $P_{30}$ has the smallest distance from the axis of rotation 2.

The geometry data can be provided by means of CAD software, for example, which can run on the computer 18. Furthermore, software can be run on the computer 18, which generates the geometry data for the shaped object, the geometry data for the individual layers of the shaped objects 2A, 2B, 2C, 2D. To load the geometry data into the print buffer 14, the computer 18 is connected with the control device 6.

Each print dot $P_k$ stored in the geometry data, for which material is supposed to be dispensed onto the support 1, is assigned to an emitter 12 of the emitter array 11, in each instance, with which the material intended for the print dot $P_k$ is applied to the support 1 or onto a solidified material layer situated on it. The assignment takes place in accordance with the numbering indicated above for the emitters 12 and the print dots, in such a manner that the number of the emitter 12, in each instance, agrees with the number of the print dot $P_k$. The print dot $P_k$, in each instance, is printed with the emitter 12 that has a distance from the axis of rotation 2 that agrees as well as possible with the distance of the print dot $P_k$ from the axis of rotation 2.

Dispensing of the material portions takes place in print cycles, in which the emitter array 11 is triggered to dispense material once, in each instance, at a trigger point A . . . H assigned to the print cycle in question, in which position the support 1 is positioned in a predetermined rotational position relative to the emitter array 11, in each instance. At every trigger, all the emitters 12 of the emitter array 11, for which the activation value "1" is stored in the printer buffer 15, in each instance, dispense a material portion. The support 1 and the emitter array 11 are offset relative to one another, from print cycle to print cycle, in each instance, by the angular distance W that rows 20 of print dots that are adjacent to one another in the circumferential direction of the axis of rotation 2 have in accordance with the geometry data. As can be seen in FIG. 5A to 5I, printing of all the print dots $P_1 \ldots P_{30}$ of a row that are to be printed takes place in 8 print cycles, in each instance. The number of print cycles is therefore greater than the number of emitter columns 13 of the emitter array 11.

Aside from an emitter 12, each print dot $P_k$ to be printed (with $k \in [1 \ldots 30]$) is also assigned to one of the eight print cycles, in each instance. The assignment takes place in such a manner that the angular difference between the rotational position of the trigger point A . . . H of the print cycle and the rotational position in which the print dot $P_k$ to be printed ($k \in [1 \ldots 30]$) is arranged with reference to the axis of rotation 2, when the support 1 is positioned at the trigger point A . . . H relative to the emitter array 11, is not greater, in terms of amount, than half the angular distances W between the trigger points A . . . H. In the event that a print dot $P_k$ (with $k \in [1 \ldots 30]$) is arranged precisely centered between two trigger points, the print dot $P_k$ in question is assigned to one of these two trigger points.

In FIG. 5A to 5I, the assignment of the print dots $P_k$ to the emitters 12 for the individual trigger points A . . . H is shown graphically. Emitters 12 that dispense material at the trigger point A . . . H in question are marked with filled black circles. Emitters 12 that do not dispense material at the trigger point A . . . H in question are marked with circular lines in FIG. 5A to 5I.

The letters in these circles indicate to which print-dot rows A . . . I shown in FIG. 4 the print dot that is assigned to the emitter 12 in question belongs. The numbers in the circles indicate in which print cycle of the emitters 12 the material for the print dot $P_k$ is supposed to be dispensed. Circular lines that surround neither numbers nor letters mark emitters 12 to which no print dot $P_k$ was assigned yet since the start of the printing process.

Figure 8A:
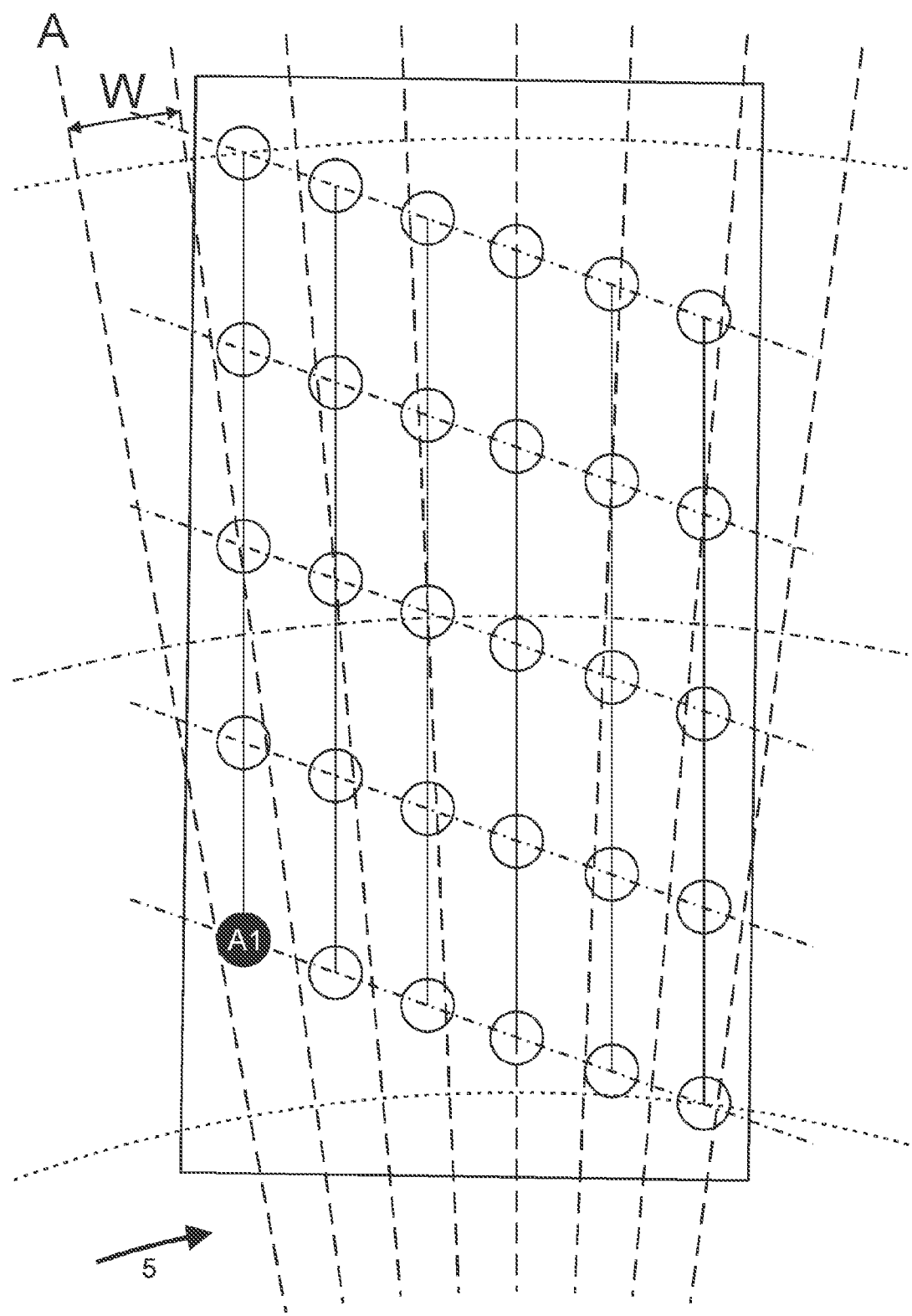
Figure 8B:
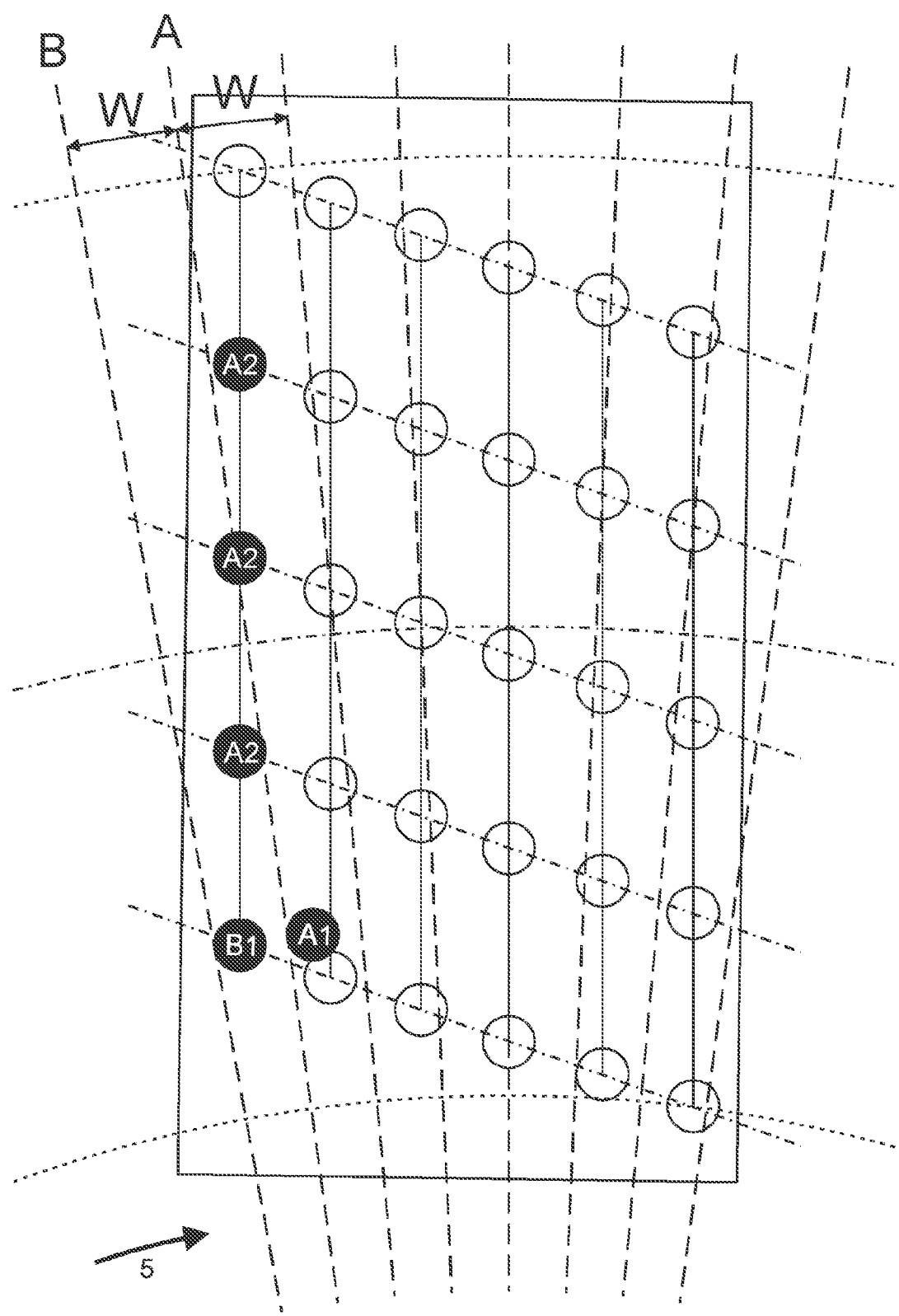
Figure 8C:
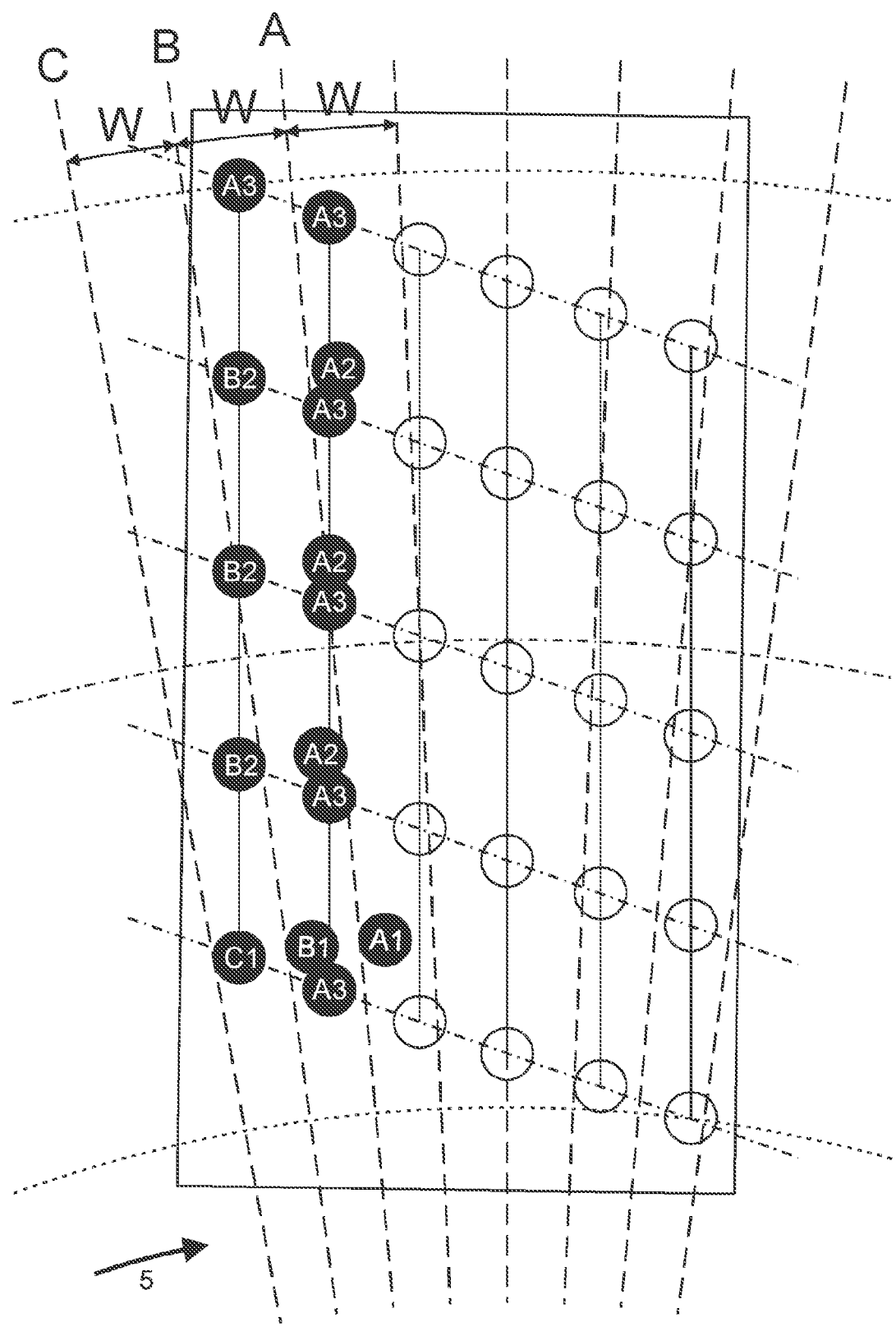
Figure 8D:
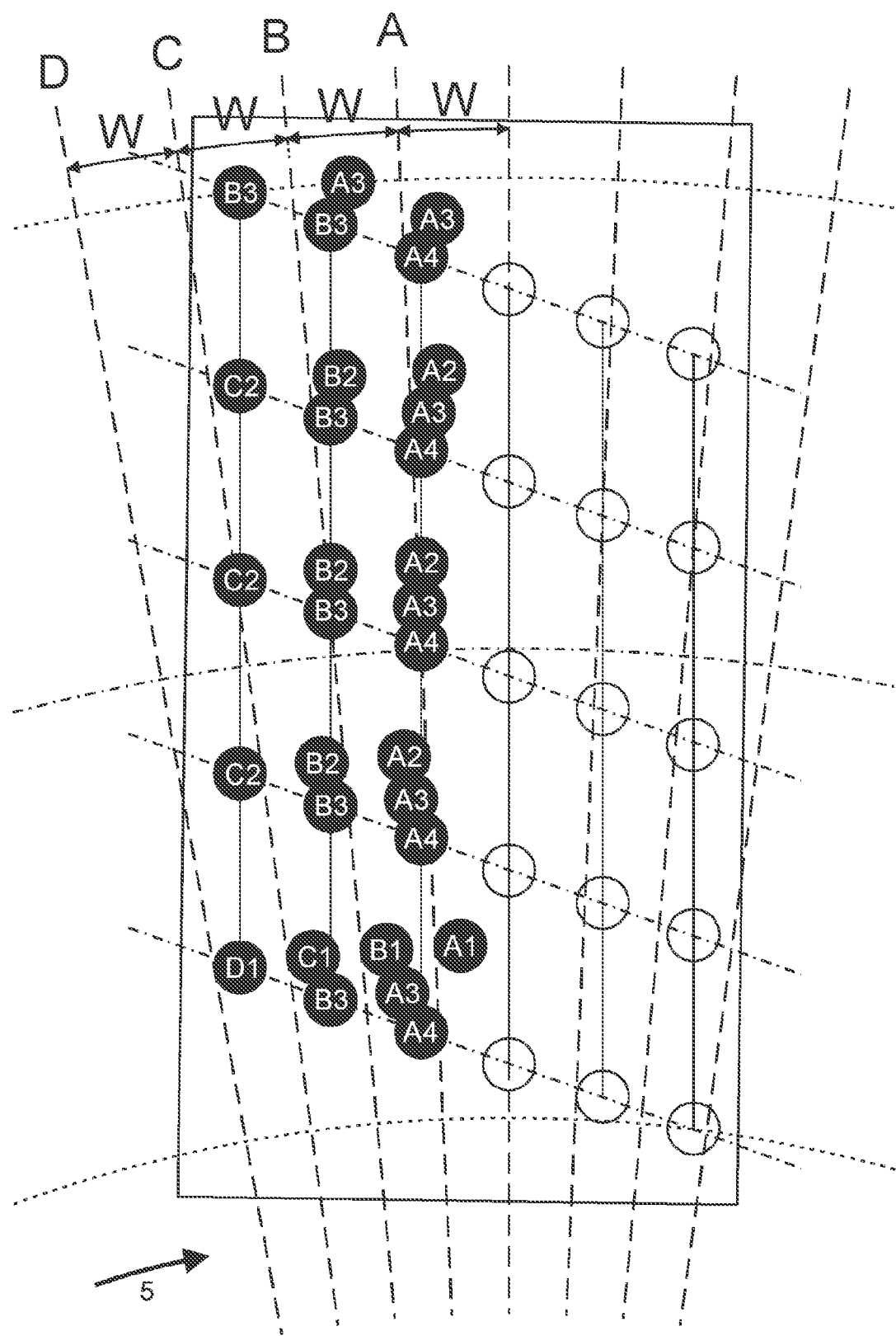
Figure 8E:
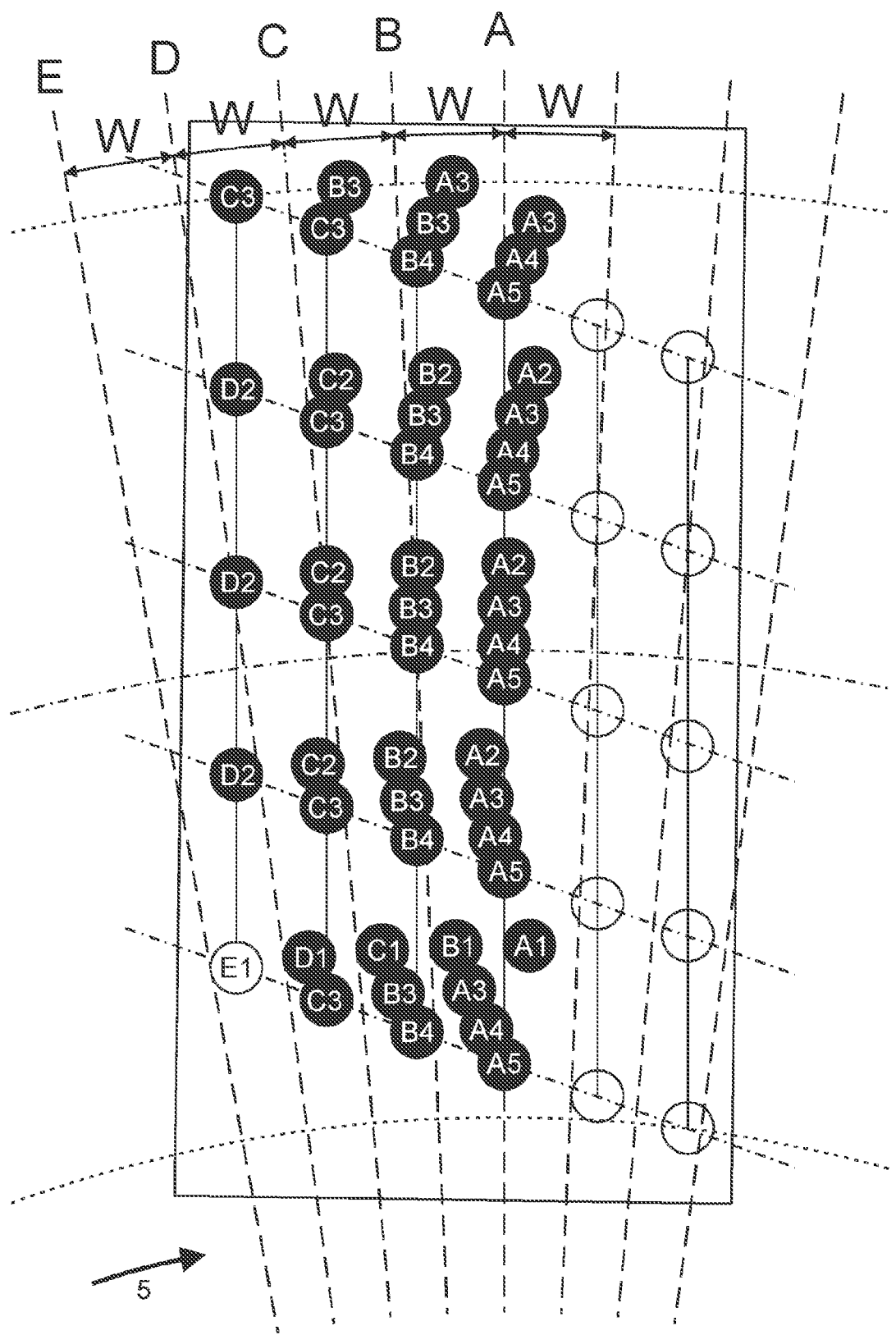
Figure 8F:
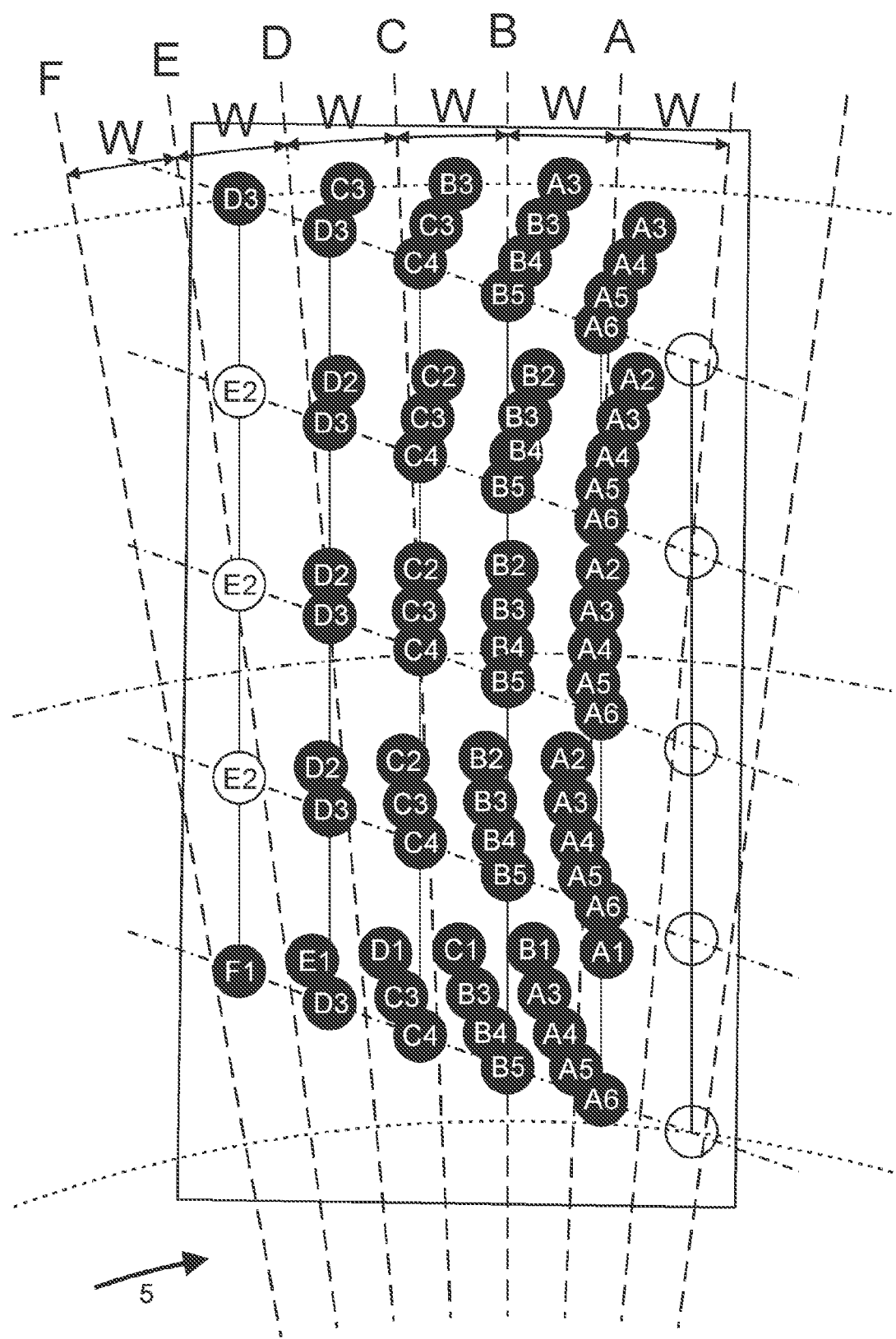
Figure 8G:
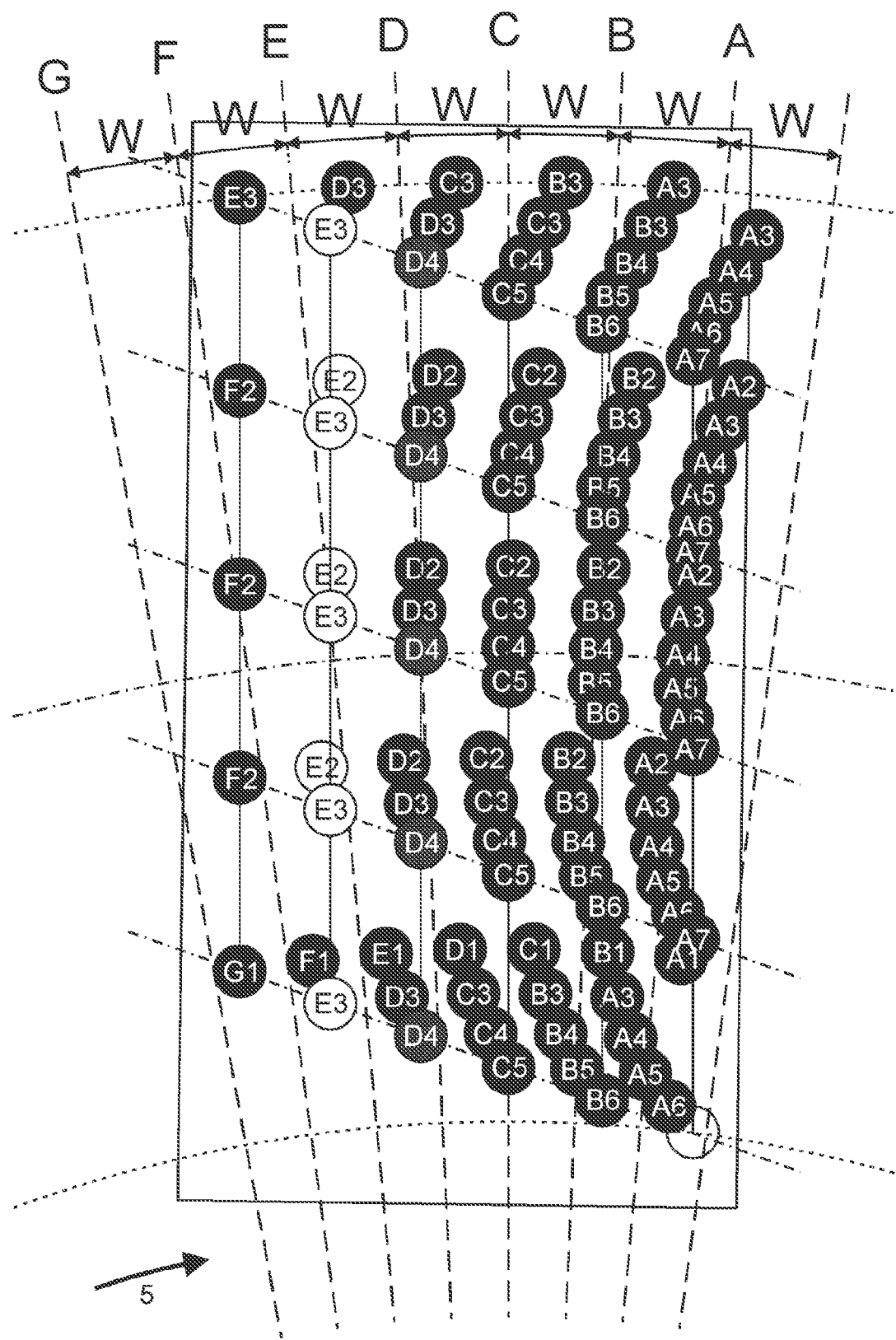
Figure 8H:
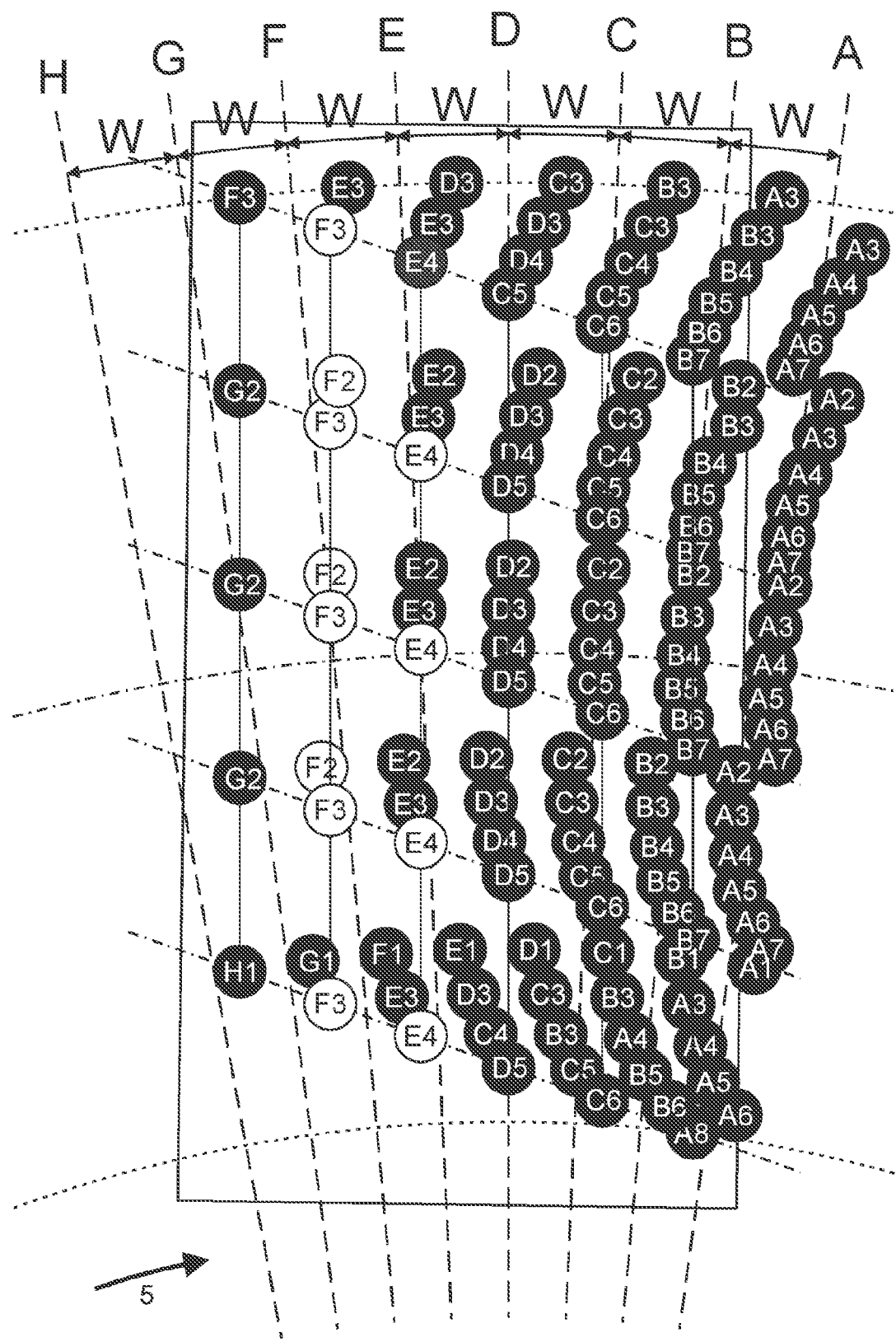
Figure 9:
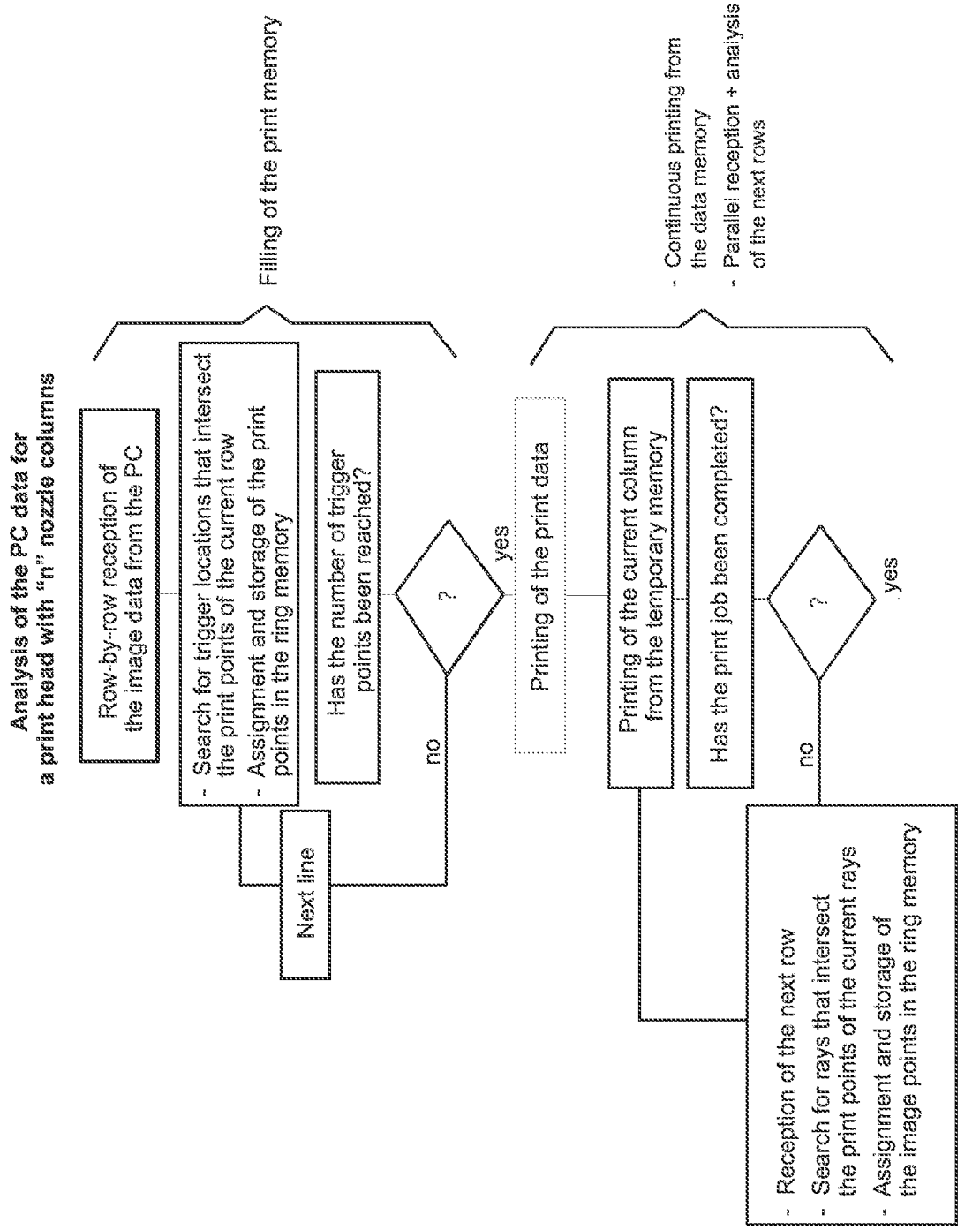

FIGS. 8A to 8H clarify the status of material application at the individual trigger points A . . . H. The designation of the print dots at which material was applied to the support 1 corresponds to the designation of the emitters 12 in FIG. 5A to 5I. At a first trigger point (FIG. 8A), material is applied to the support 1 only at the location designated as "A1". In FIG. 8B, material is additionally applied to the support 1 at the locations designated as "A2" and "B1". In FIG. 8C, material is applied to the support 1 at ten further locations, which are designated as "A3", "B2", and "C1", etc.

For the assignment of the print dots $P_k$ to the trigger points A . . . H, a ring memory is provided, which has eight memory spaces. Each of these memory spaces is assigned to one of the eight print cycles, in each instance. Each memory space comprises 30 memory locations, namely one for each emitter 12 of the emitter array 11.

In the following, it will be explained how the data are processed in the ring memory during the printing process. First, 30 print dots $P_k$ (with $k \in [1 \ldots 30]$) are read out of the data memory for a first row 20 of the geometry data. As described above, one of the thirty emitters 12 is assigned to these print dots $P_k$, in each instance. An activation value that has the logical value "1" or "0" is stored in the memory locations of the ring memory assigned to these emitters 12, in each instance. In this regard, the value "1" indicates that the emitter 12 assigned to the print dot $P_k$ in question is supposed to be operated or activated in the print cycle assigned to the memory space in question.

In a further method step, 30 print dots $P_k$ (with $k \in [1 \ldots 30]$) are read out from the data memory for a further row 20 of print dots stored in the data memory. As described above, one of the thirty emitters 12 is assigned to each of these print dots $P_k$, in each instance. An activation value is stored in the memory locations of the ring memory assigned to these emitters 12, in each instance, which value indicates whether the emitter 12 assigned to the print dot $P_k$ in question is supposed to be activated in the print cycle assigned to the memory space in question.

The steps mentioned in the last two paragraphs are repeated until 30 print dots $P_k$ (with $k \in [1 \ldots 30]$) have been read out of the data memory for all eight print cycles, in each instance, and corresponding activation values for these print dots were stored in the ring memory (FIG. 6A to 6H).

In a further method step, the support 1 and the emitter array are positioned relative to one another at the trigger point A . . . H assigned to the print cycle in the memory space of which activation values were first stored, and the emitters 12 of the emitter array 11 are controlled as a function of the activation values stored in this memory space. In this regard, each emitter 12 for which the activation value "1" is stored in the ring memory for the trigger point A . . . H in question is activated. Emitters 12 for which the material-dispensing value "1" was not stored in the ring memory for the trigger point A . . . H in question are not activated at this trigger point A . . . H.

Now it is checked whether all the rows of the material layer to be printed have already been printed. If this is not the case, the memory spaces are cyclically interchanged, in such a manner that the memory space to which the trigger point A is assigned, at which point the support 1 and the emitter array 11 were last positioned relative to one another, is the first memory space (FIG. 7A to 7H). Then geometry data are read in from the data memory 19 for a further row, and processed in a corresponding manner.

After all the print-dot rows of the current material layer have been printed, it is checked whether at least one further material layer is supposed to be printed. If this is the case, the support 1 is lowered, relative to the emitter array 11, by the thickness of the material layer, so as to afterward print a further material layer as described above.

Figure 4:
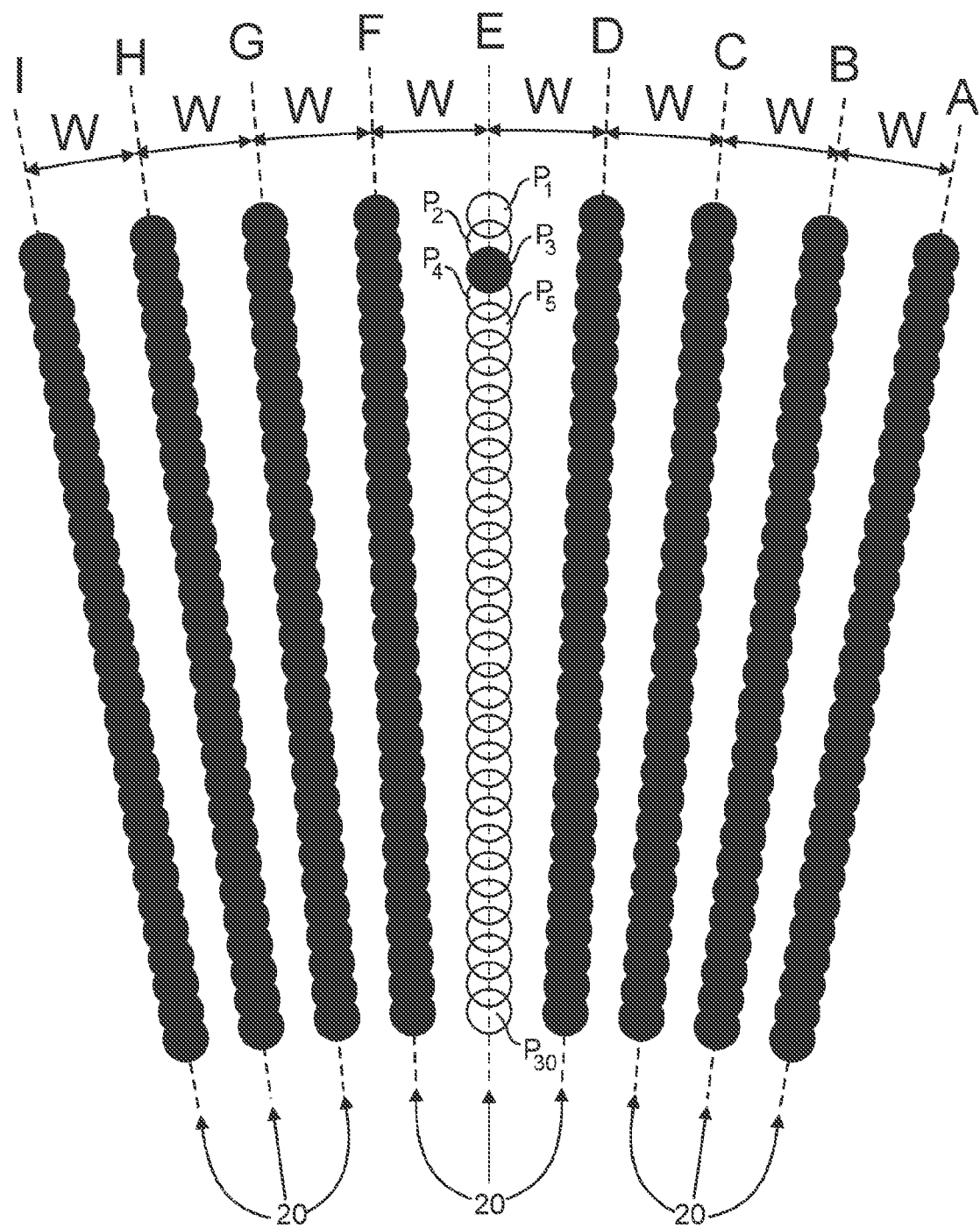
Figure 5A:
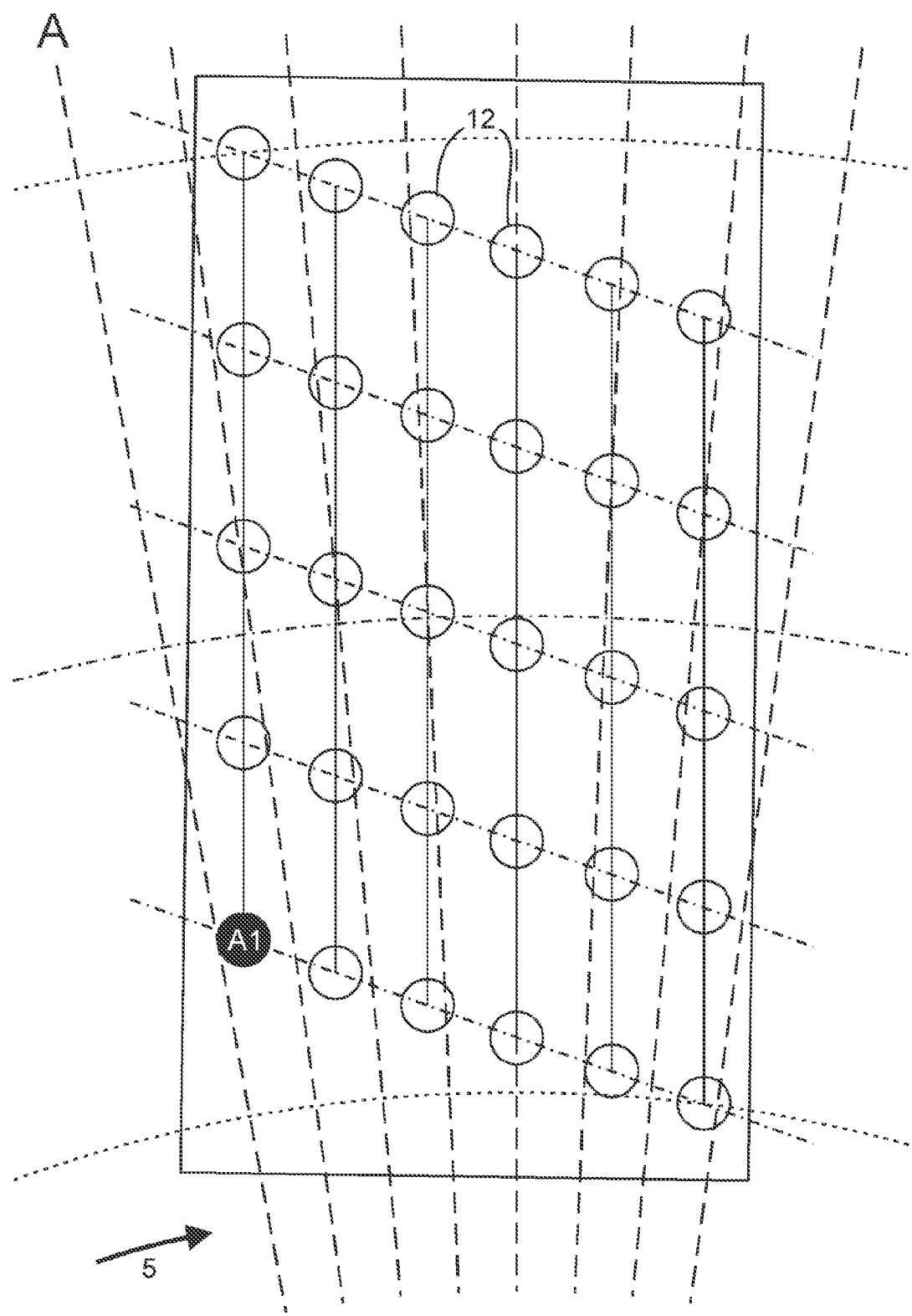
Figure 5B:
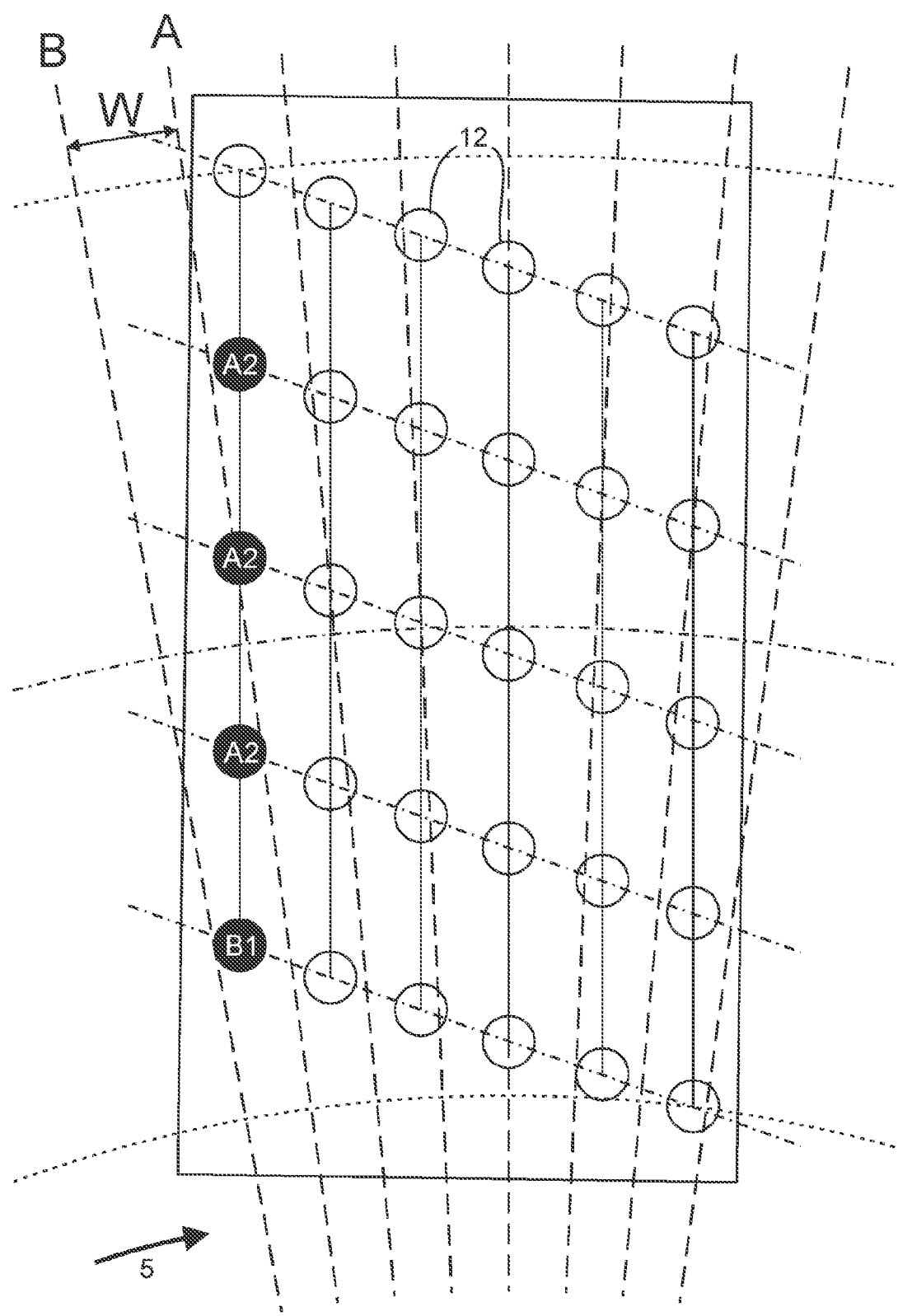
Figure 5C:
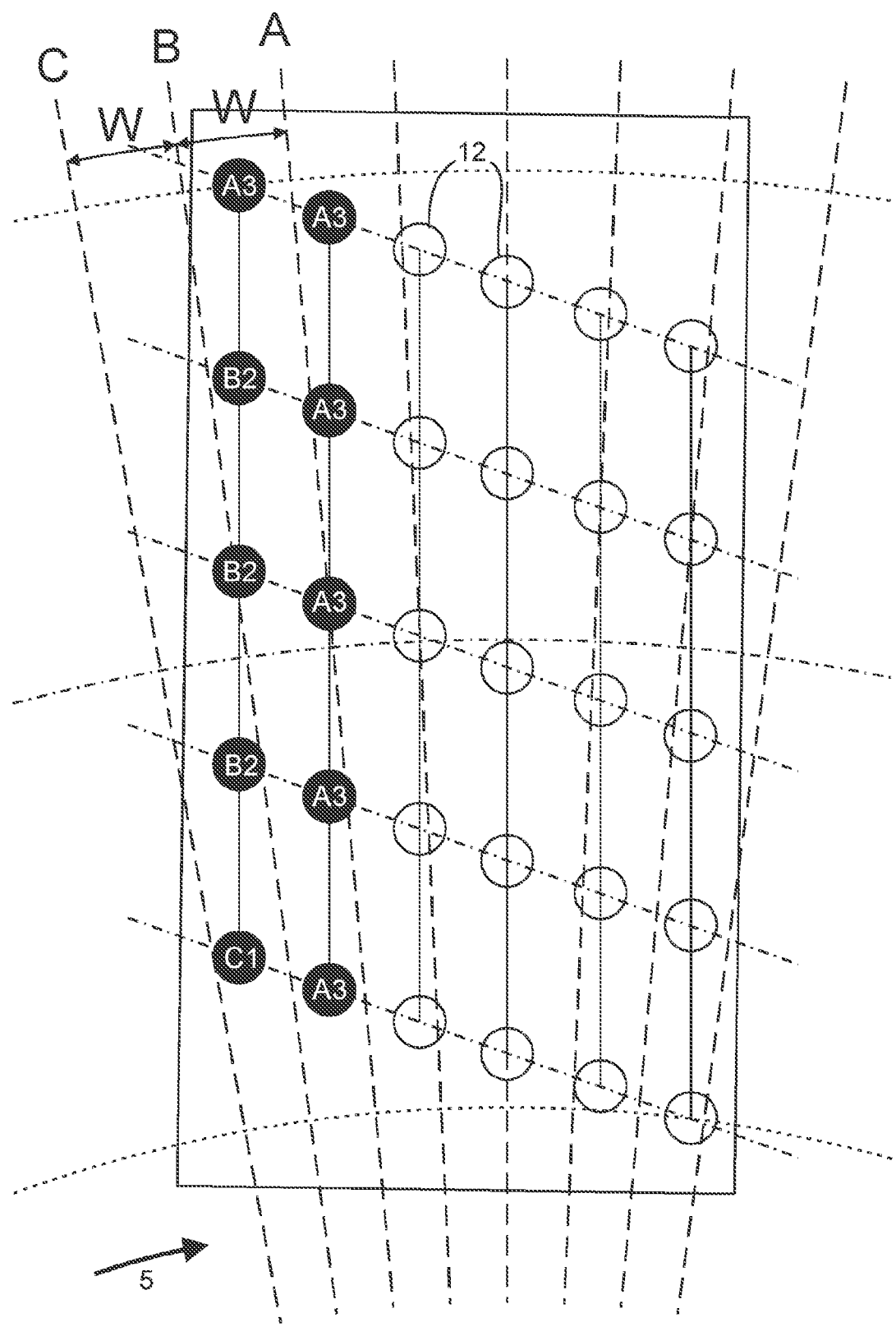
Figure 5D:
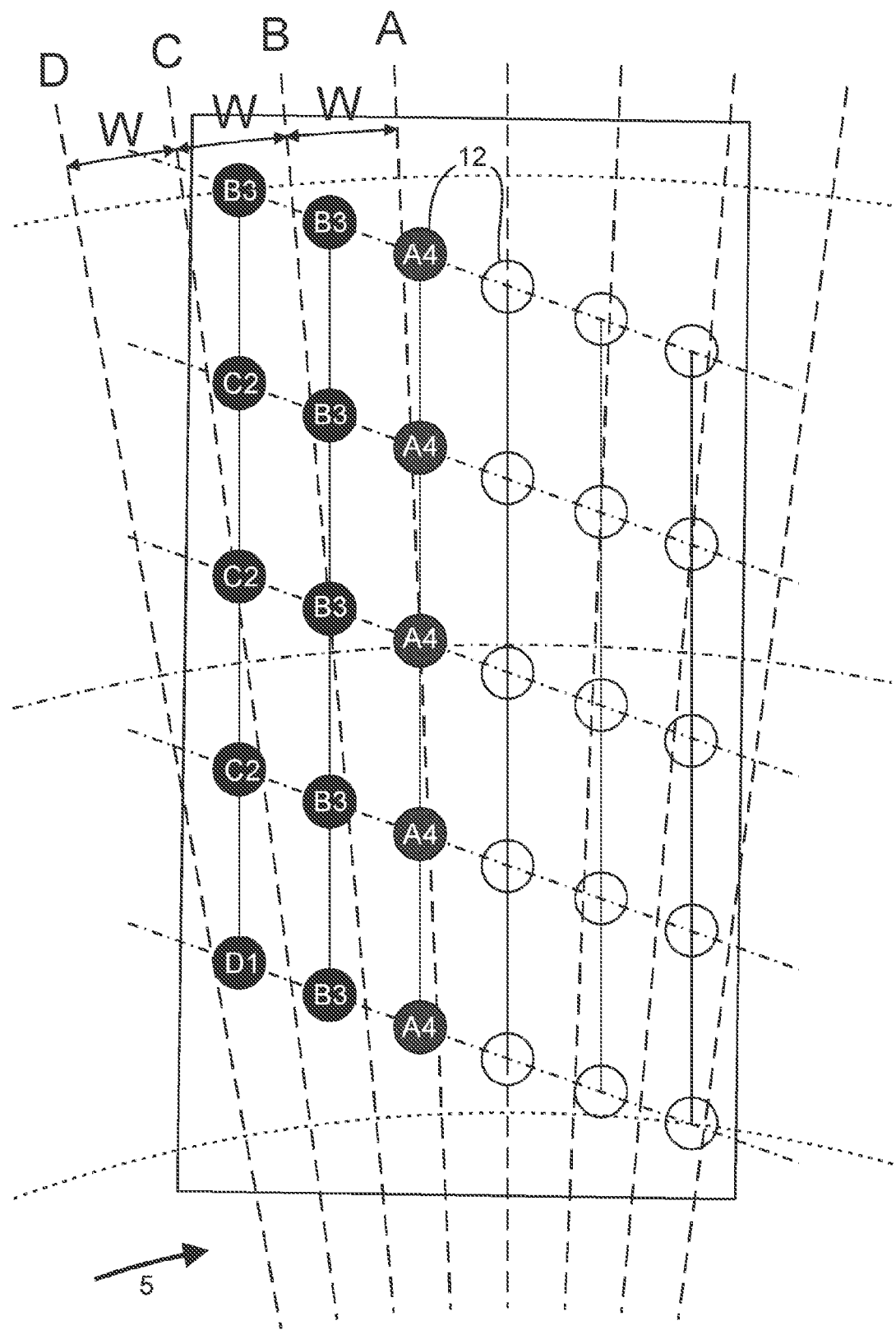
Figure 5E:
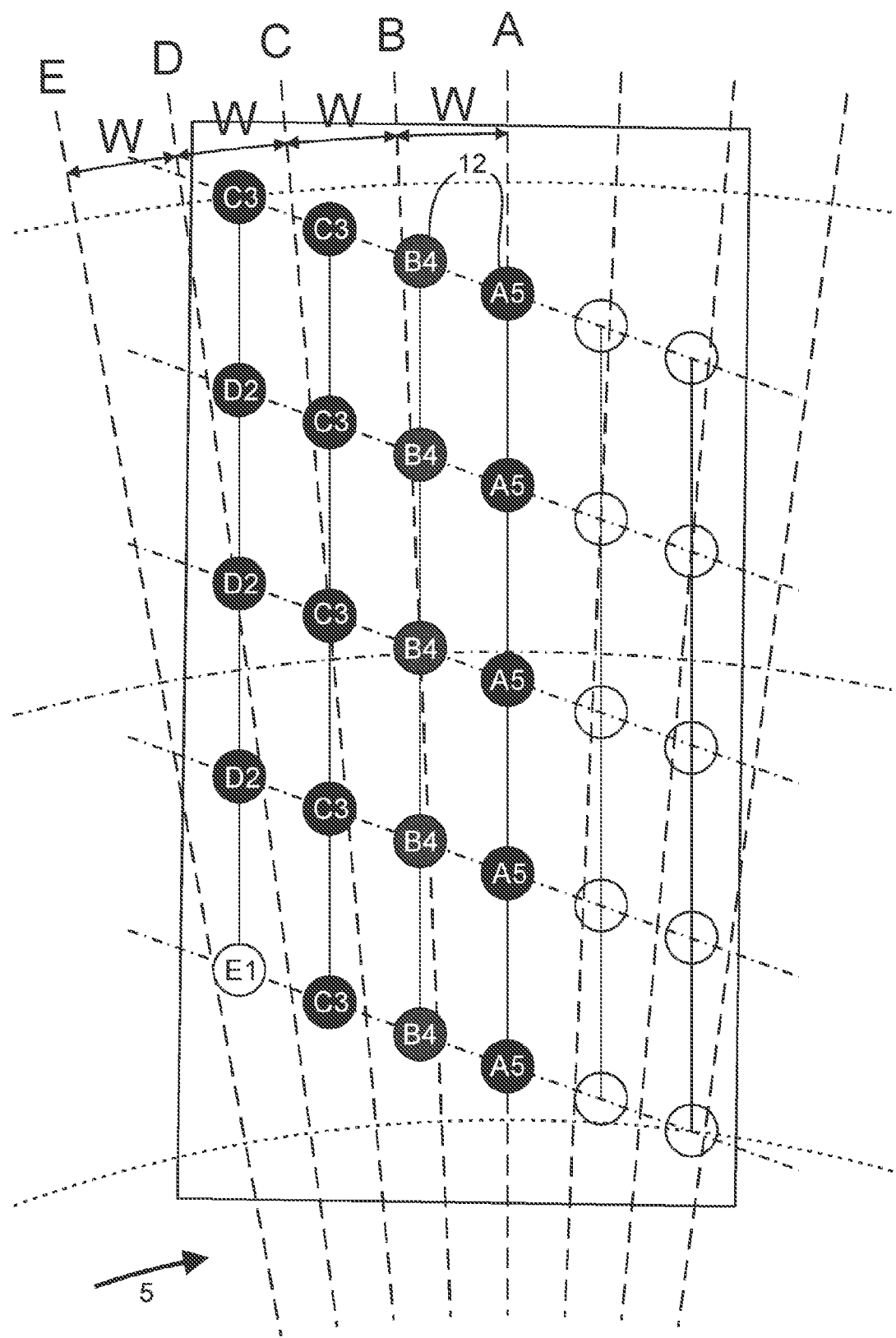
Figure 5F:
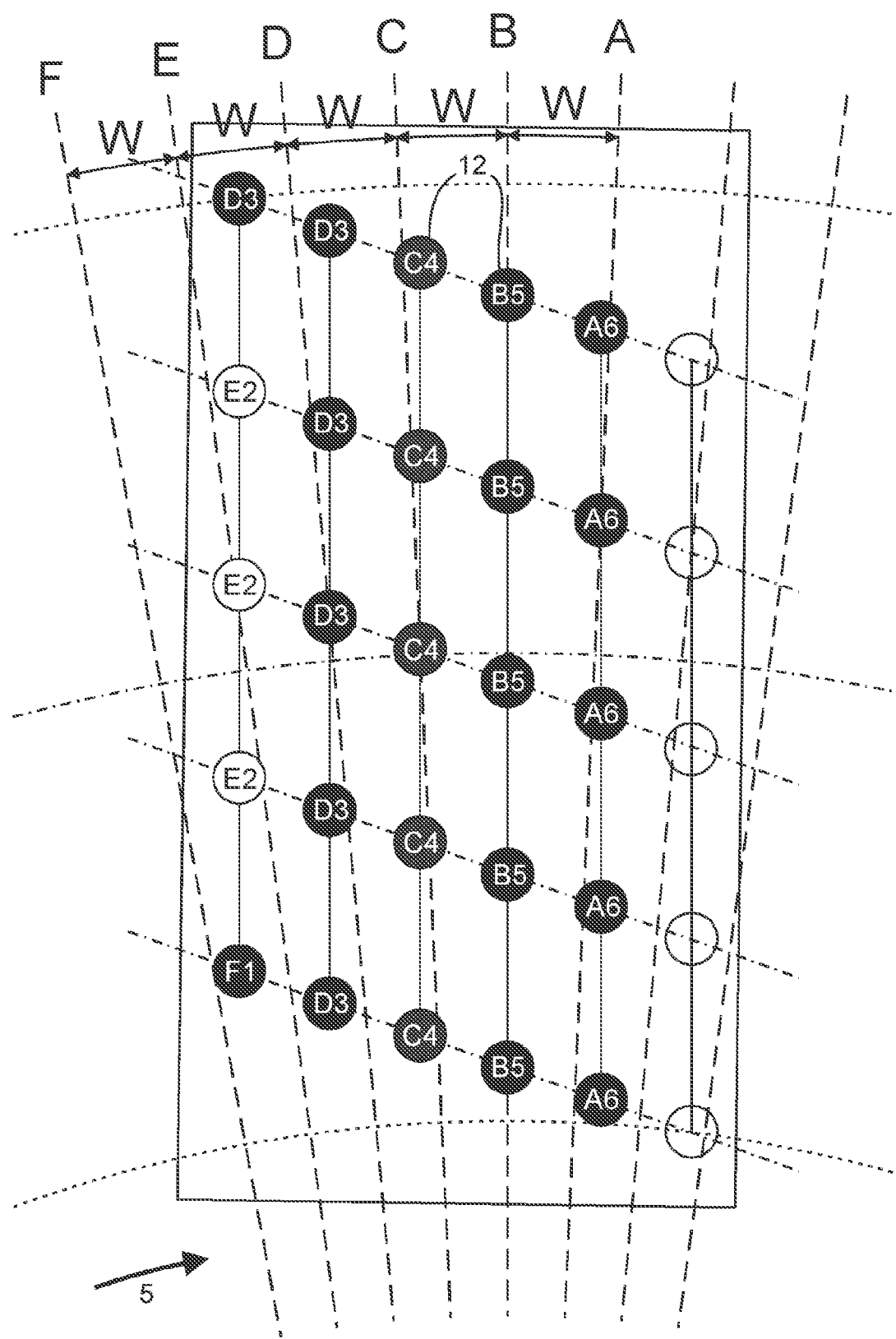
Figure 5G:
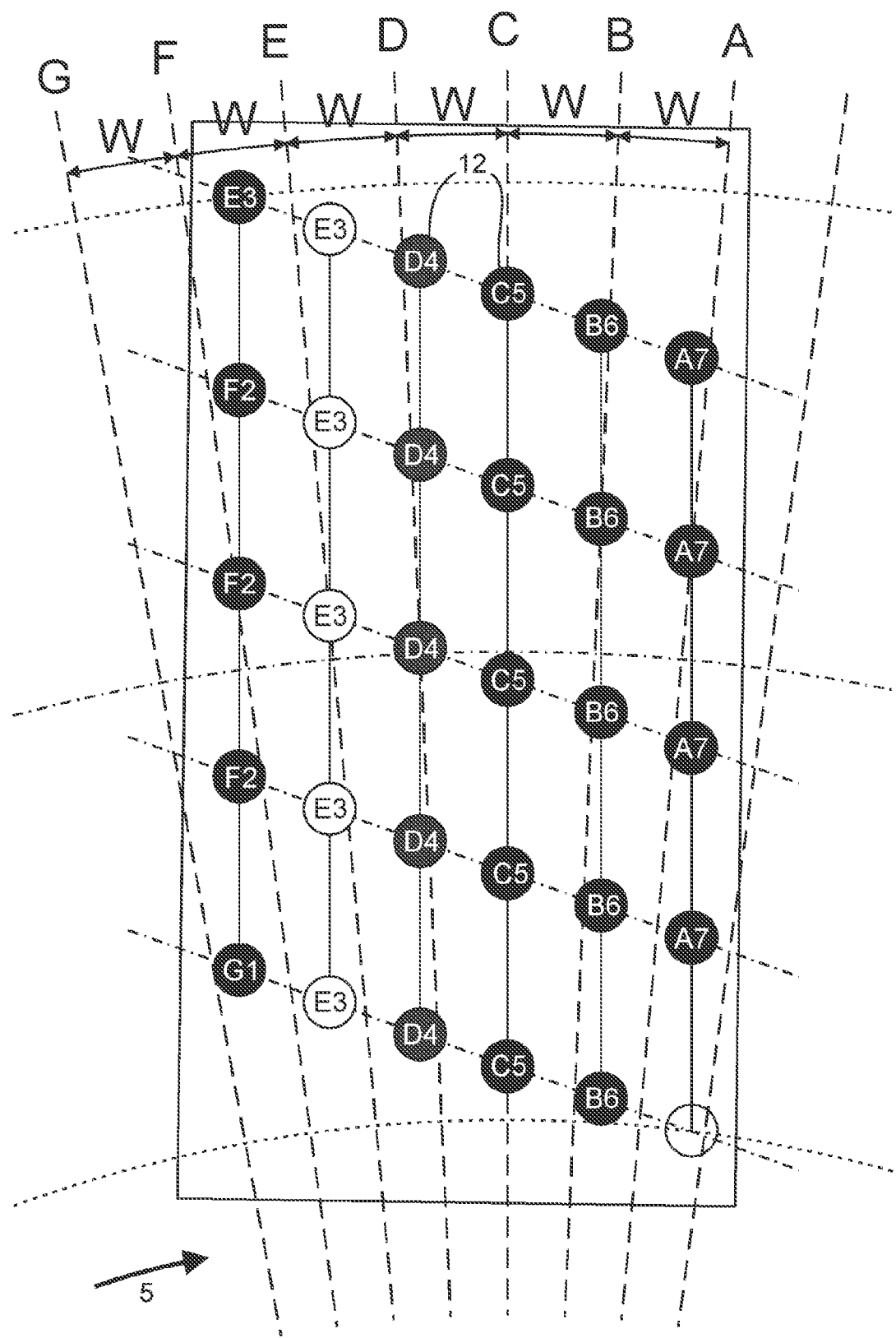
Figure 5H:
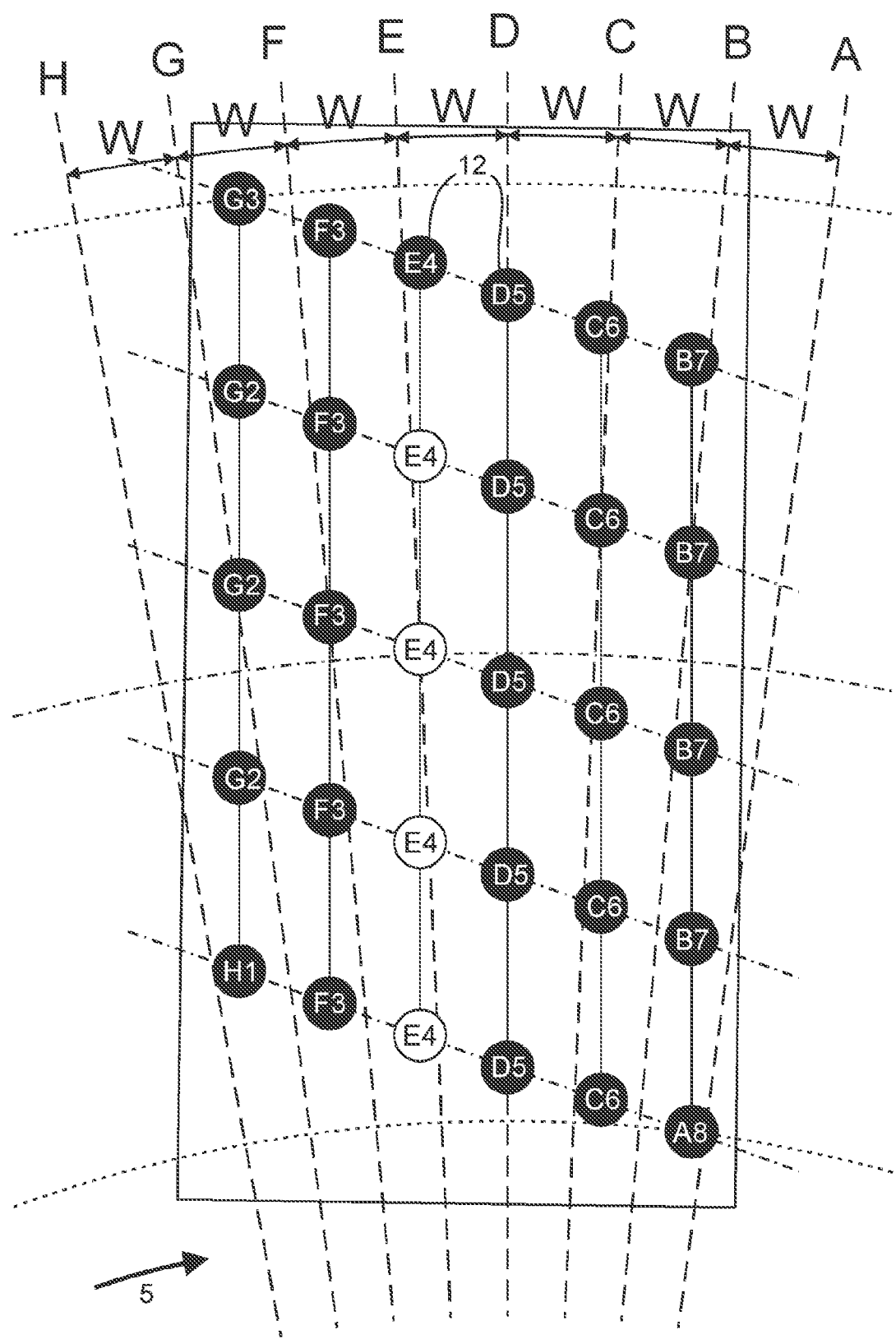
Figure 5I:
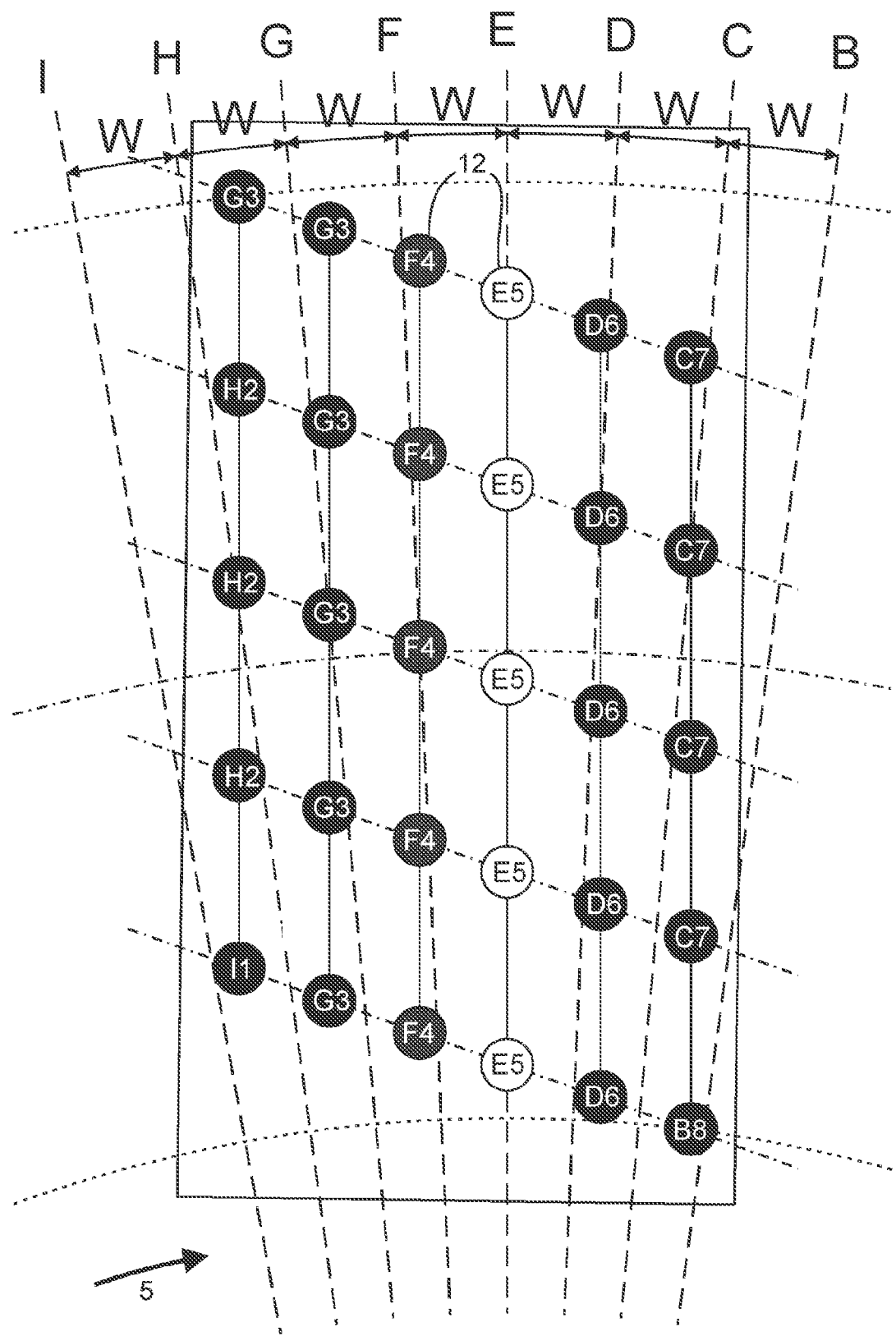
Figure 10:
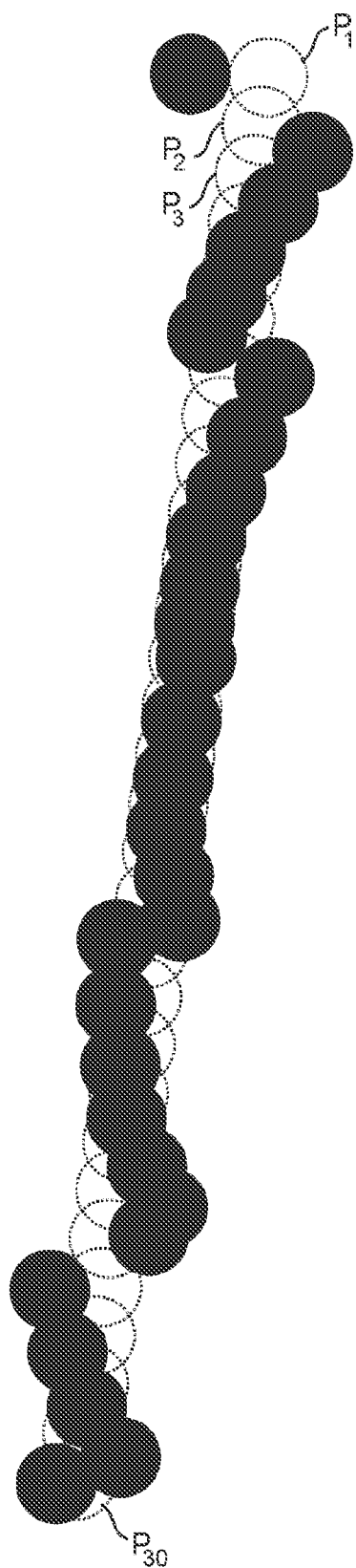

In FIG. 10, the geometry data row "A" from FIG. 4, printed onto the support 1 in accordance with the method, is shown. The material portions dispensed onto the support 1 are marked with full-area black circles. These circles can also be seen in FIG. 8H, on the right, where they are designated (from top to bottom) as A3, A3, A4, A5, A6, A7, A2, A3, A4 . . . A5, A6, A8. The other circles shown in FIG. 8H, which are assigned to the geometry data rows "B" to "I" from FIG. 4, are not shown in FIG. 10, for reasons of clarity.

Locations at which the print dots are supposed to be applied to the support in accordance with the geometry data used for printing the row "A" from FIG. 4 are outlined with circular lines in FIG. 10 (reference print data). As can be seen, good agreement of the printed result with the geometry data is achieved in the center part of the line. At the ends of the line, greater deviations occur, in each instance, between the printed result and the geometry data. These come about mainly in that the distances between the emitters 12 of the emitter array 11 and the arrangement of the emitters 12 were selected in a different way from what is normal in practice, for reasons of better legibility of the drawings. For the method according to the invention, an emitter array 11 is preferred, which has a greater dimension in the radial direction than in FIG. 3. Thus, for example, the emitter array 11 can have 24 emitters in every row 10 instead of the five emitters 12 shown in FIG. 3. For the method according to the invention, an emitter array 11 is furthermore preferred, in which the quotient of the dimension that the emitter array 11 has at a right angle to its longitudinal axis and parallel to the plane of the support 1, to the inside diameter of the imprintable region of the support 1, is smaller than that shown in FIG. 5A to 5I.

As can be seen in FIG. 4, the rows with the print dots were furthermore arranged in such a manner, for reasons of better legibility of the drawings, that they are spaced apart from one another by means of interstices. For the method according to the invention, however, a matrix in which the print dots of adjacent rows overlap in certain regions is preferred.

Figure 11:
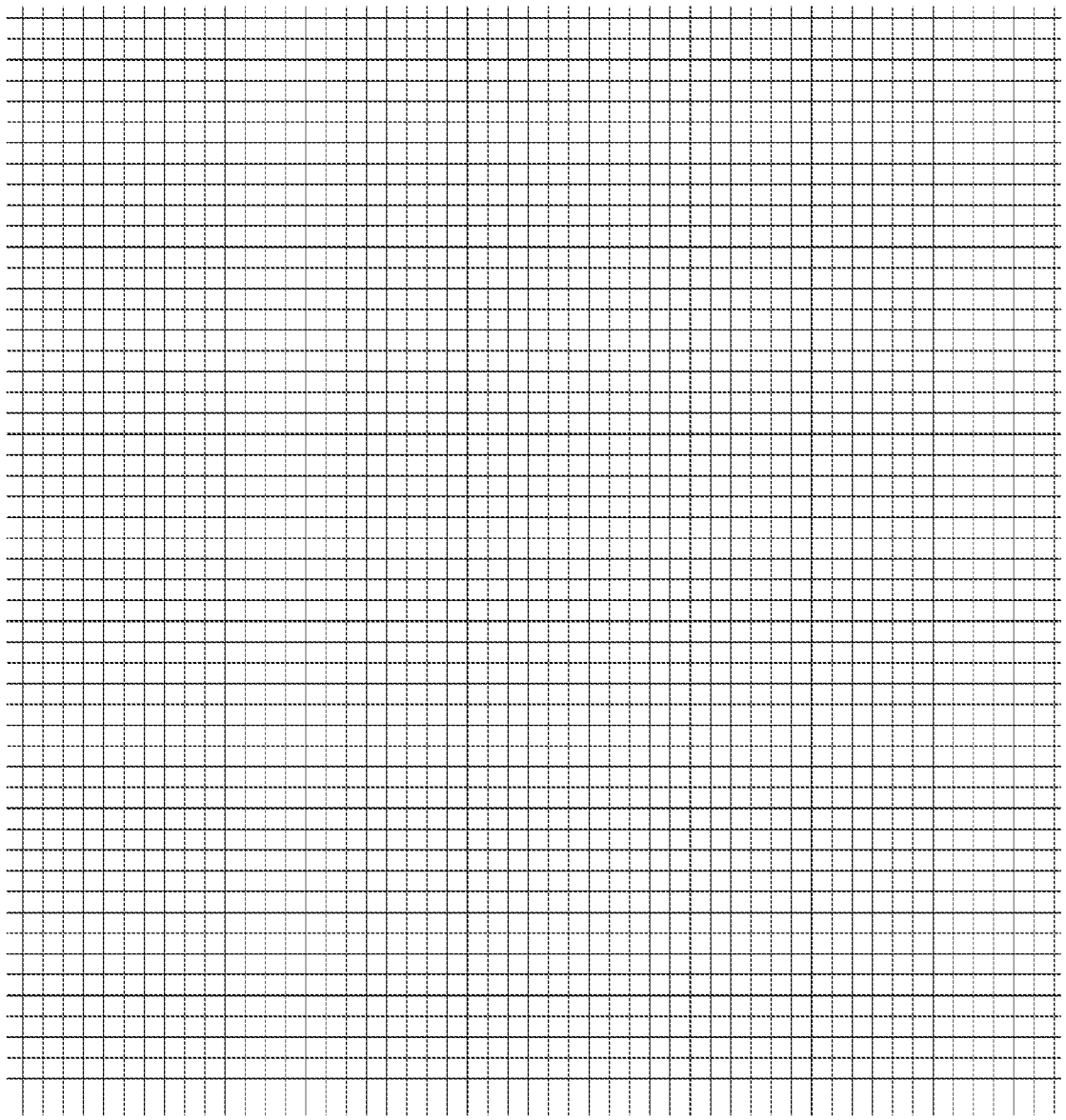
Figure 12:
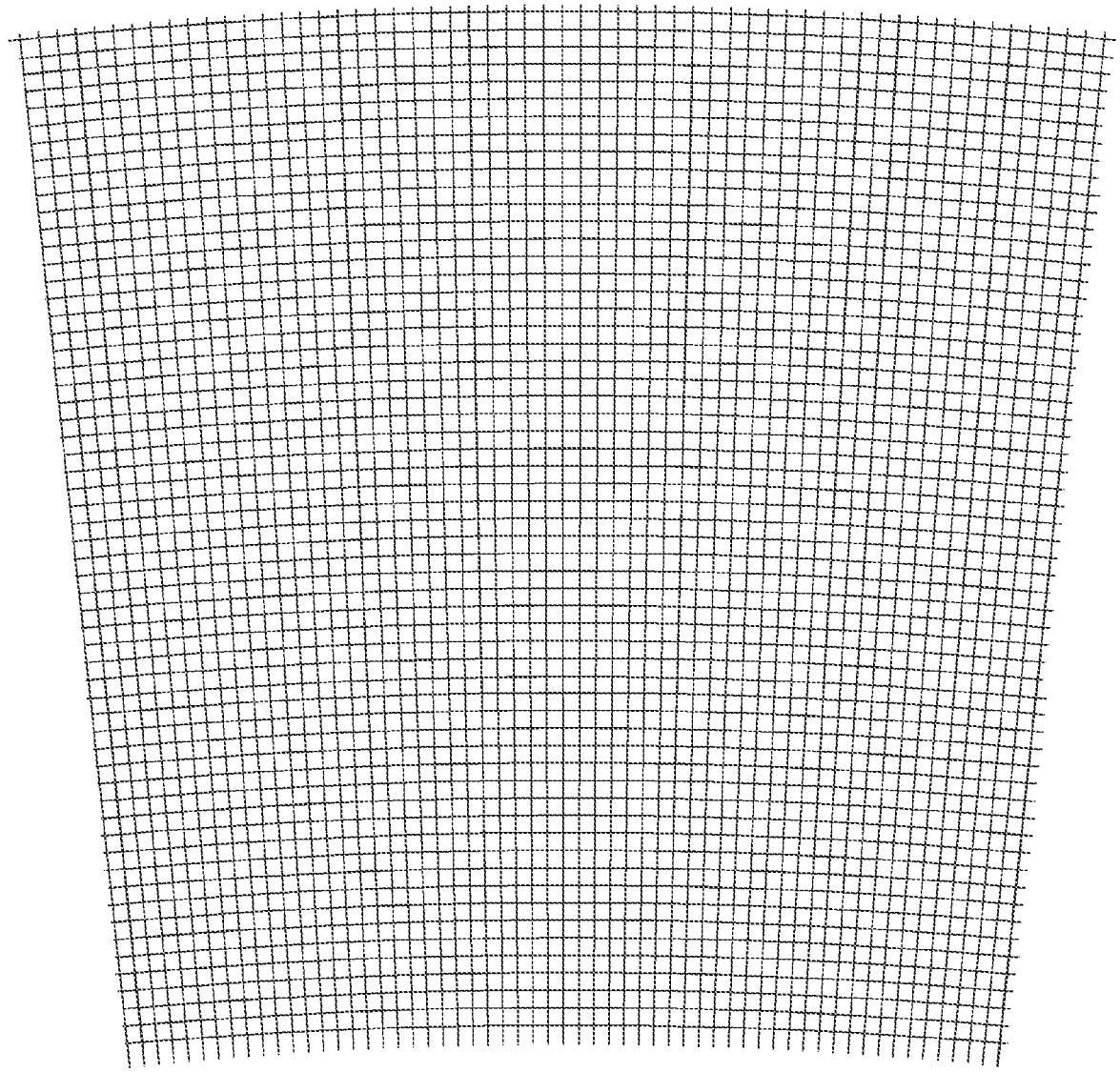

In FIG. 11, geometry data for printing a Cartesian line pattern, having a plurality of intersecting lines that run at a right angle to one another, are graphically shown for a further exemplary embodiment. In FIG. 12, it can be seen how the lines printed using the method according to the invention are arranged on the support 1. Distortions occur due to the different coordinate systems (Cartesian geometry data and polar printing apparatus). The horizontal lines of the geometry data are printed onto circular lines, and the vertical lines of the geometry data run radially relative to the axis of rotation after printing. In spite of these distortions, however, the individual printed lines continue to be perceived as individual lines by the human eye.

Figure 13:
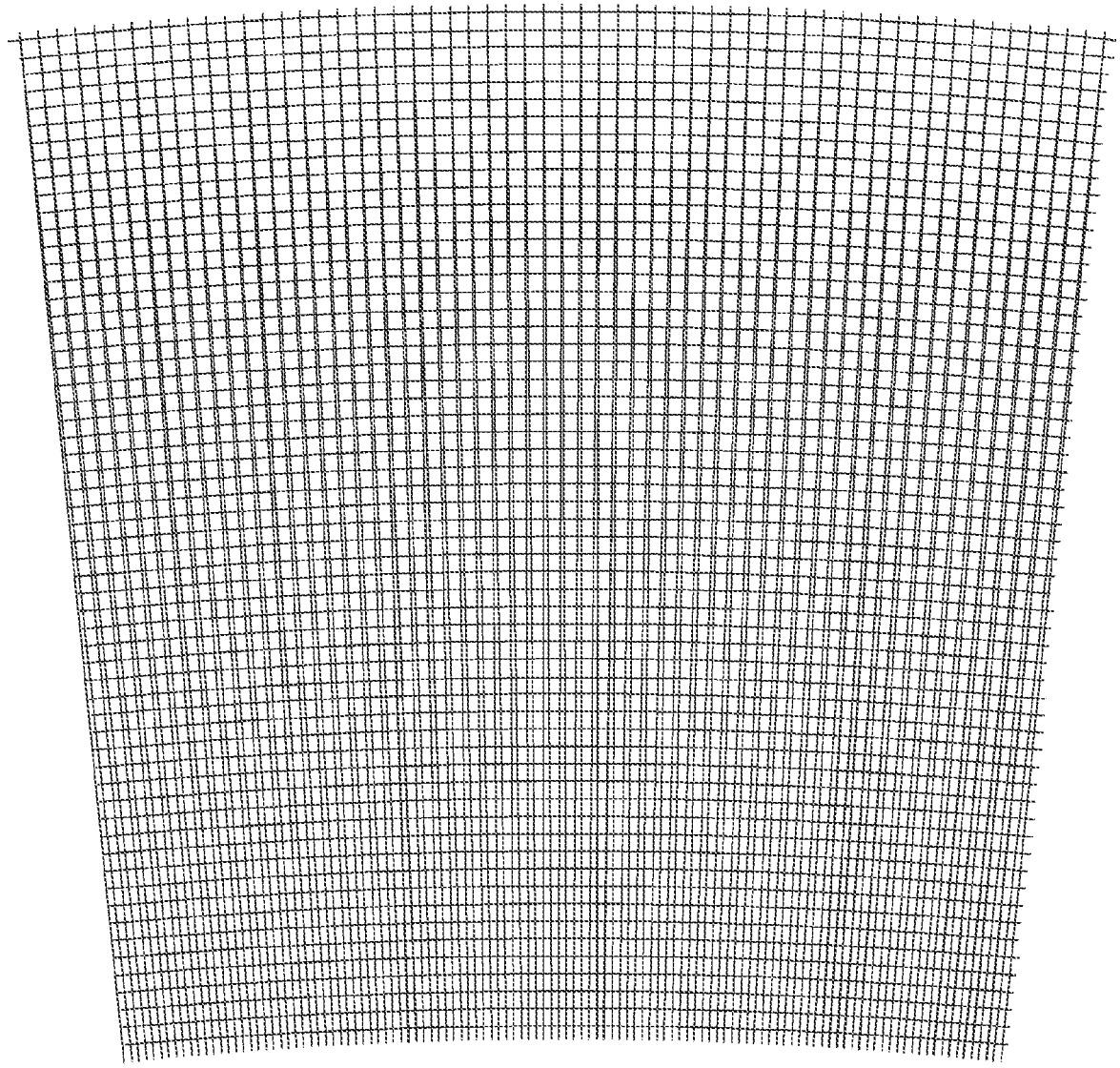

FIG. 13 shows the printed result if the geometry data from FIG. 11 are printed using a method not in accordance with the invention, in which the number of print cycles corresponds to the number of emitter columns. It can be clearly seen that the vertical lines from FIG. 11 appear to the human eye as two lines arranged in V shape after printing. This defect comes about in that the different circumference that the region of the support 1 to be printed has at its inner and outer edge was not compensated in the case of FIG. 13. As a result, the emitters 12 are not triggered correctly, in particular at the inner edge of the support.

Figure 14:
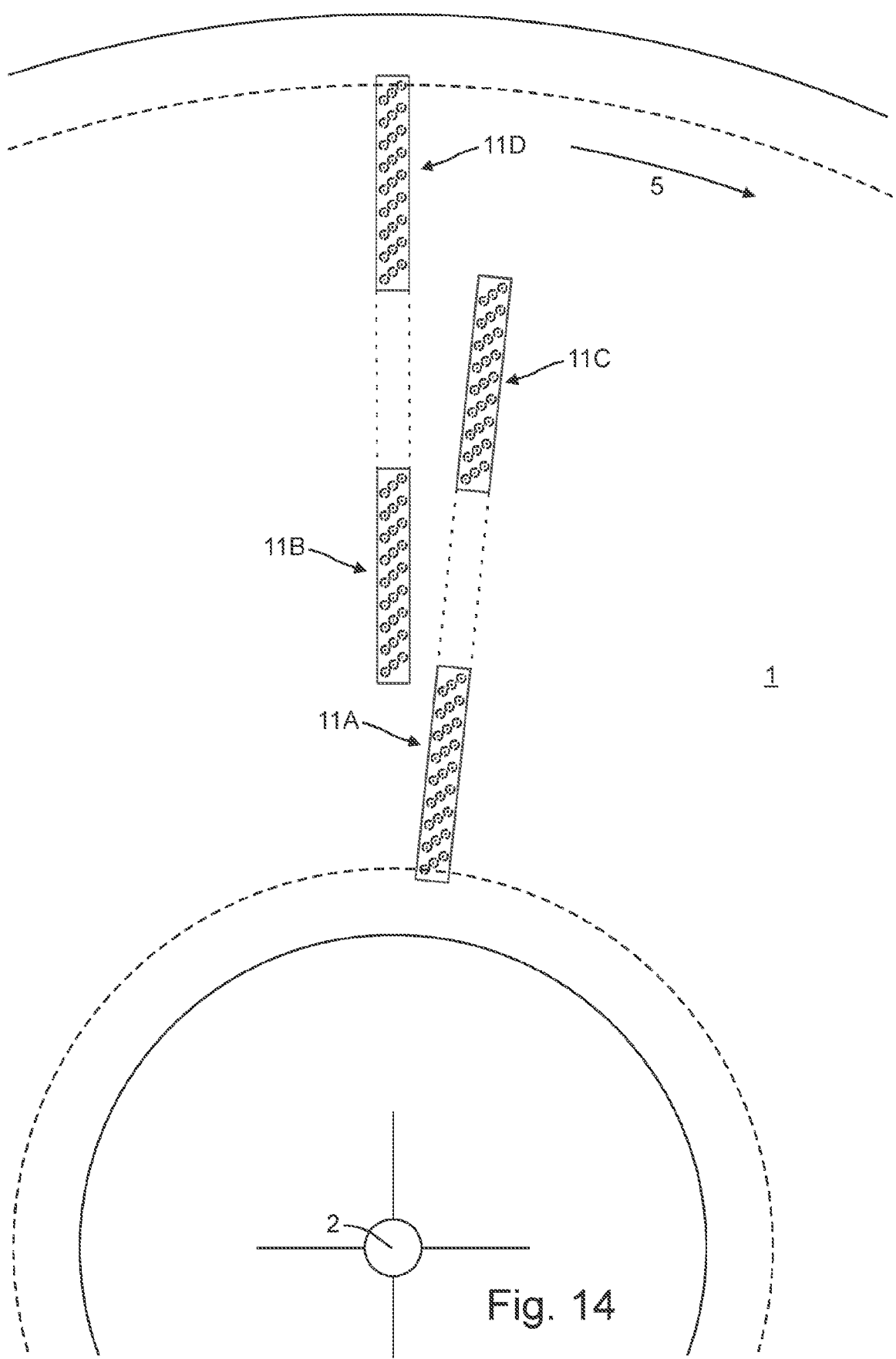

In the exemplary embodiment shown in FIG. 14, multiple emitter arrays 11A, 11B, 11C, 11D are provided for imprinting printed rings arranged concentrically relative to the axis of rotation 2, each delimited by an inner and an outer circular path. The emitter arrays 11A, 11B, 11C, 11D are positioned relative to the axis of rotation 2 in such a manner that the arithmetical average value of the inner and the outer circular path of the emitter arrays 11A, 11B, 11C, 11D differ from one another. Each of the emitter arrays 11A, 11B, 11C, 11D has 27 emitters 12, in each instance. The emitter array 11A serves for printing the print dots 1 . . . 27, the emitter array 11B serves for printing the print dots 28 . . . 54, the emitter array 11C serves for printing the print dots 55 . . . 81, and the emitter array 11C serves for printing the print dots 82 . . . 108. The emitter arrays 11A and 11C are arranged in a first rotational position with reference to the axis of rotation 2, and are triggered at the same trigger point. The emitter columns 13 of the emitter array 11A align in a straight line with the corresponding emitter columns 13 of the emitter array 11C. The emitter arrays 11A and 11C are therefore assigned to one another, as is shown schematically in FIG. 14 by means of dotted connection lines.

The emitter arrays 11B and 11D are arranged in a second rotational position that differs from the first rotational position, with reference to the axis of rotation 2. The emitter arrays 11B and 11D are thereby also assigned to one another.

This arrangement, with print heads or emitter arrays 11A to 11D placed in a divided manner, occurs when using emitter arrays 11A to 11D that have a low print width in the radial direction. When using a print head having a print width that extends over the entire width of the rotary table of the support 1, the emitter arrays 11A, 11B, 11C and 11D would be placed in a row.

Figure 15:
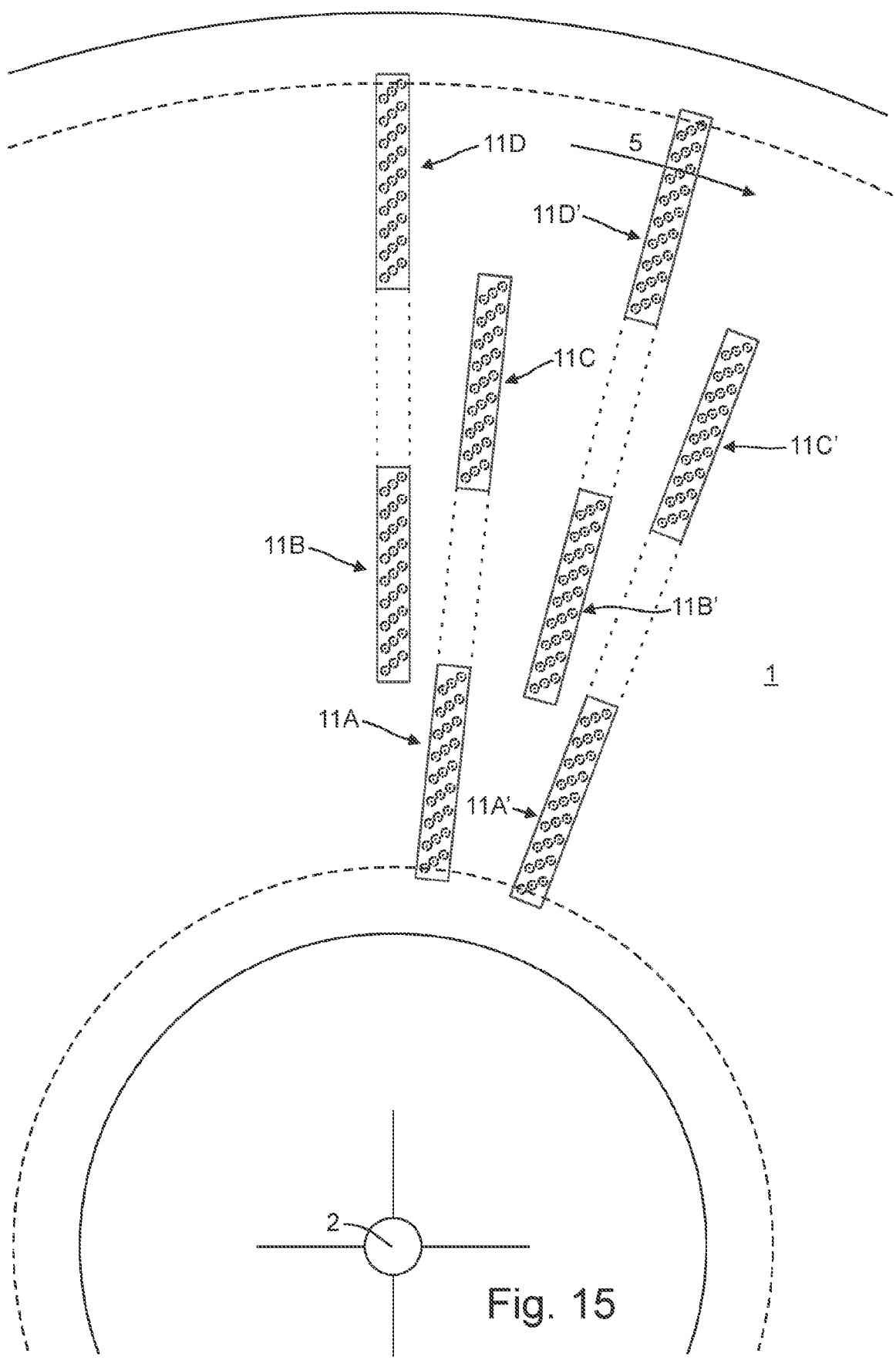

It can be seen in FIG. 15 that multiple emitter arrays 11A, 11C and 11A', 11C' or 11B, 11D and 11B', 11D', respectively, that are assigned to one another, can be arranged offset relative to one another in the circumferential direction of the axis of rotation 2.

Figure 16:
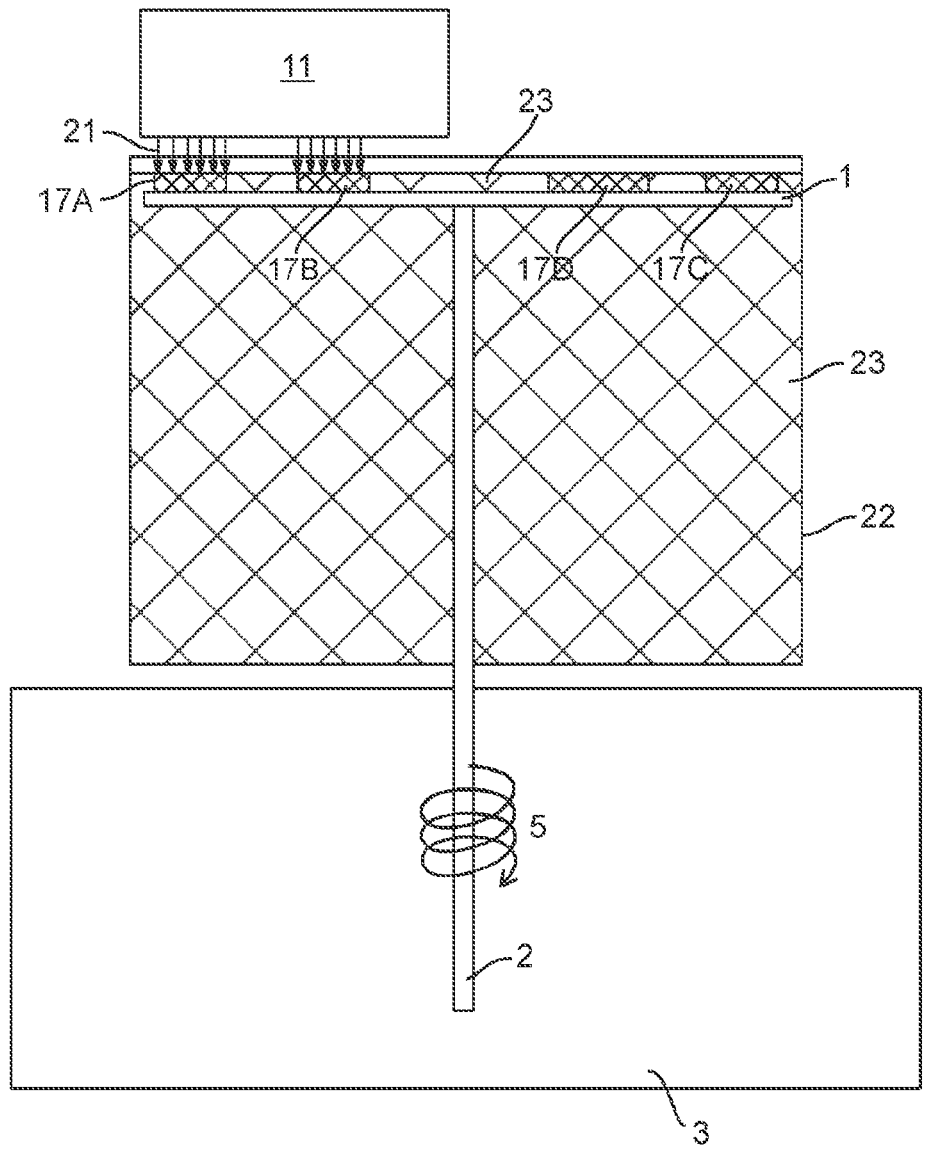
Figure 17:
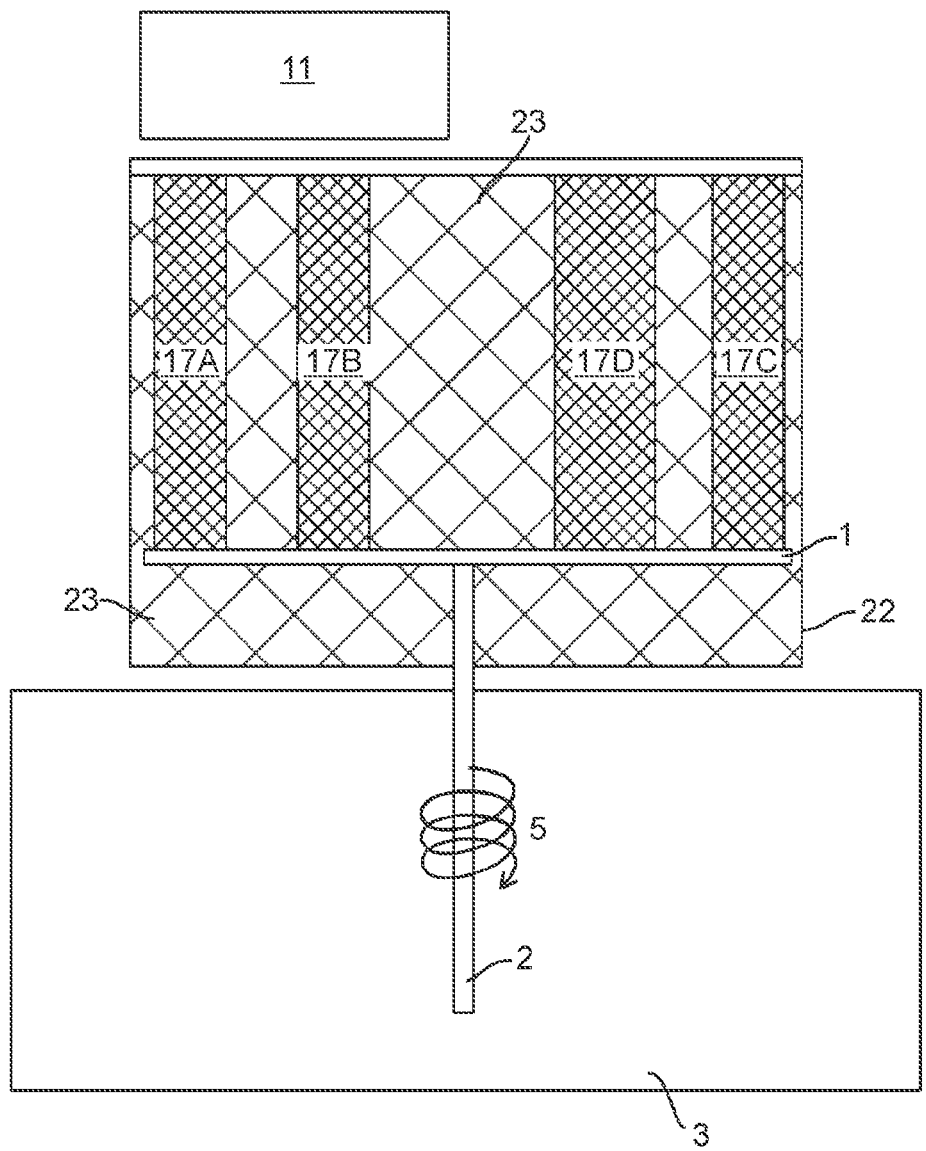
Figure 18:
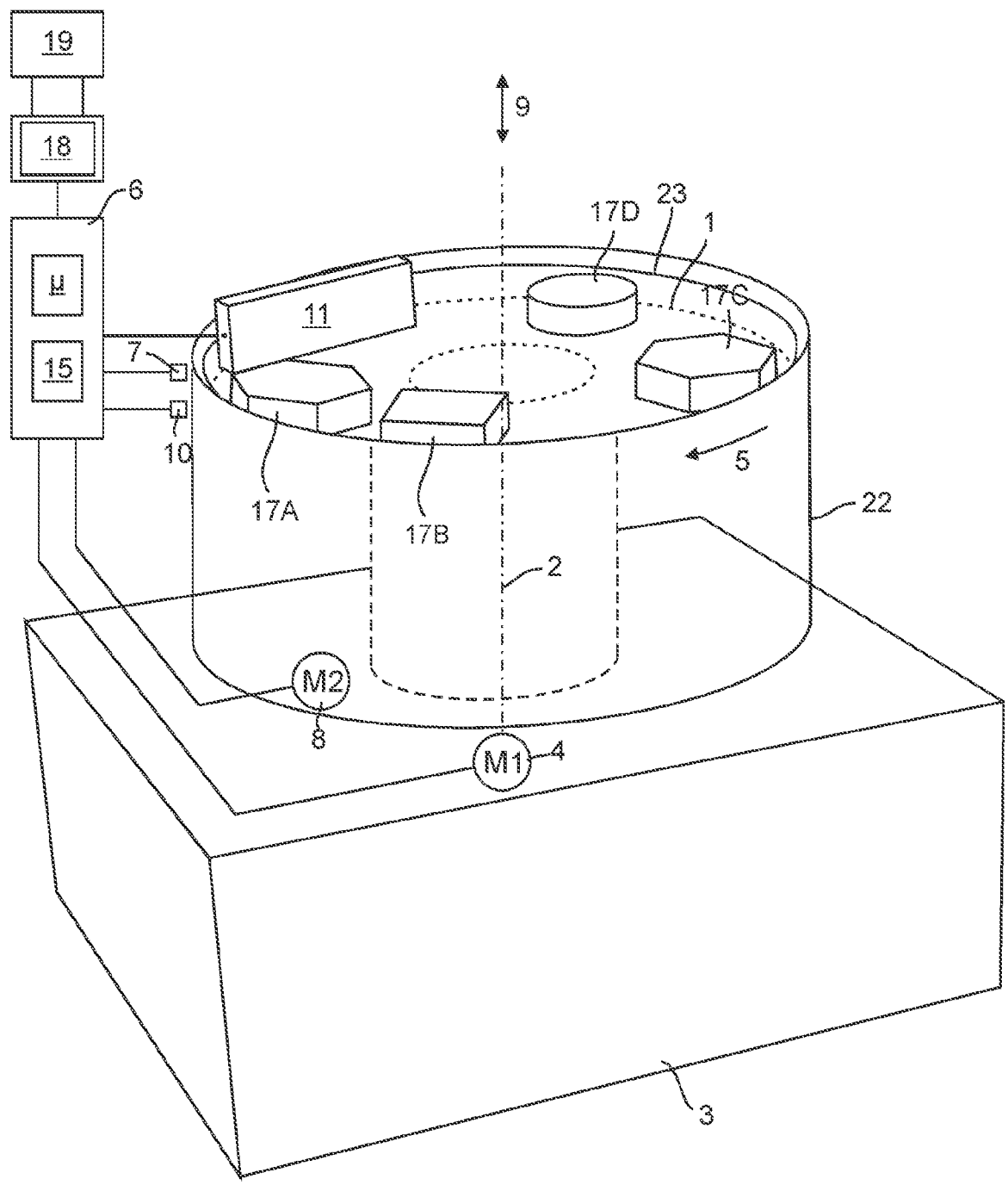

In an exemplary embodiment of the invention shown in FIGS. 16 to 18, an apparatus is provided that has a container 22, in which a liquid, paste-like or powder-form material 23 is applied to a support 1. For irradiation of the material 23 with energy-rich electromagnetic radiation 32, the emitter array 11, 11A, 11B, 11C, 11D having multiple radiation emitters 12 that are structured as light-emitting diodes, in each instance. For bundling or focusing of the radiation 21 emitted by the individual emitters 12, optics not shown in any detail in the drawing are arranged in the beam path of the emitters 12, in each instance.

The wavelength and the power of the electromagnetic radiation 21 that can be generated by means of the emitters 12 are coordinated with the material 23 capable of flow in such a manner that this material can be solidified at the irradiation point by means of irradiation with the electromagnetic radiation 21. In the case of a material 23 that is liquid or capable of flow, "to solidify" is understood to mean that the material 23 is hardened to form a solid-body material, in particular by means of cross-linking of polymers and/or copolymers contained in the material. In the case of a powder-form material 23, "to solidify" is understood to mean that material particles present as solid-body particles are heated by means of irradiation with the electromagnetic radiation 21 and subsequently cooled, in such a manner that they are firmly connected with one another.

The emitter array 11, 11A, 11B, 11C, 11D has multiple emitter columns 13A, 13B, 13C, in which the center points of the emitters 12, in each instance, are offset relative to one another in a straight line. The arrangement of the radiation emitters 12 corresponds to the arrangement of the emitters 12 in FIGS. 3, 5A to 5I, 8A to 8H, 14, and 15, which are structured as nozzles, so that the description of the emitter arrays 11, 11A, 11B, 11C, 11D shown in these figures applies analogously for the exemplary embodiment according to FIGS. 16 to 18, but with the difference that the emitters 12 in the exemplary embodiment according to FIGS. 16 to 18 emit radiation 21 instead of material, and that the radiation 21 is directed at the material 23 capable of flow.

The support 1 situated in the container 22 is rotationally positioned relative to the emitter array 11, 11A, 11B, 11C, 11D, about an axis of rotation 2, and the radiation generated by means of the emitters 12 is directed at a material layer situated on the surface of the material 23, in such a manner that the material 23 is solidified in at least one radiation location.

The emitter array 11 is connected with a print buffer 15, in which an activation signal for each emitter of the emitter array 11, in each instance, can be temporarily stored. A control device for controlling the radiation emitters 12 is provided, which has a trigger input. For each trigger that is received at the trigger input, all the emitters 12 of the emitter array 11, for which the value "1" is stored in the printer buffer 15, in each instance, emit radiation in the direction of the material 23. Emitters 12 for which the value "0" is stored in the printer buffer are not activated when a trigger is received, i.e. these emitters 12 do not emit any radiation.

FIGS. 6A to 6H and 7A to 7H, which show the activation signal values for the emitter array 11 at the individual trigger points for the apparatus shown in FIGS. 1 and 2, apply analogously for the exemplary embodiment in FIGS. 16 to 18.

In the exemplary embodiment shown in FIGS. 16 to 18, the support 1 stands in a drive connection with a first positioning device, which has a first drive motor 4, by means of which the support 1 can be driven to rotate in the direction of the arrow 5 and can be positioned in accordance with a rotational position reference value signal provided by a control device 6. For this purpose, the first drive motor 5 is connected with a first position regulator integrated into the control device 6, which regulator has an encoder 7 for detecting a rotational position signal for the support 1. Using the first positioning device, the support 1 can be rotated continuously and without stopping, over almost any desired angles of more than 360° relative to the holder 3, about the axis of rotation 2.

The support 1 is furthermore in a drive connection with a second positioning device, which has a second drive motor 8, by means of which the support 1 can be displaced up and down in the direction of the double arrow 9, relative to the holder 3, and can be positioned in accordance with a height position reference value signal provided by the control device 6 (FIG. 18). Positioning can take place step by step or continuously. For this purpose, the second drive motor 10 is connected with a second position regulator integrated into the control device 6, which regulator has a position sensor 10 for detecting the height position of the support 1.

The invention claimed is:

1. A method for producing at least one solid-body layer on a support that can be rotated about an axis of rotation, in accordance with predetermined geometry data, a) wherein for dispensing material portions of the material that can pass through the nozzles, onto a support, an emitter array having a number of N emitters configured as material-dispensing nozzles is provided, which are arranged in matrix form, in emitter columns that are offset parallel to one another, and are arranged in emitter rows that are offset parallel to one another and run transverse to the emitter columns, wherein emitter columns that are adjacent to one another in the circumferential direction of the axis of rotation are offset from one another, in each instance, in the expanse direction of the emitter columns, in such a manner that the individual emitters of the emitter array are arranged at different radial distances $DA(i)$ from the axis of rotation, wherein it holds true that:

$$DA(i) > DA(i+1)$$

where $i \in [1 \ldots (N-1)]$ b) wherein print dots ($P_M \ldots P_{M+N}$) are assigned to the geometry data, which dots are offset from one another, in a matrix having multiple rows that run next to one another, in which a number of Q print dots is arranged, in each instance, in such a manner that it holds true that:

$$PA(j) > PA(j+1),$$

where $j \in [M \ldots (M+N-1)]$ and $1 \leq M \leq Q-N$, wherein $PA(j)$ is the radial distance of the $j^{th}$ print dot $P_j$ of the row in question from the axis of rotation, and M is a whole number, c) wherein for print dots $P_k$, for which material is supposed to be dispensed onto the support, at least one material portion, in each instance, is dispensed from the emitter $D_k$ of the emitter array that is assigned to the print dot $P_k$ in question, wherein k is a whole number between M and M+N−1, d) wherein dispensing of the material portions takes place in print cycles in which the emitter array is triggered to dispense material once, in each instance, at a trigger point assigned to the print cycle in question, and the support as well as the emitter array are offset relative to one another, in each instance, from print cycle to print cycle, by an angular distance with reference to the axis of rotation, e) wherein printing of all the print dots $P_M \ldots P_{M+N-1}$ of a row that are to be printed takes place in a number of print cycles that is greater than the number of the emitter columns, f) wherein the print cycle for each print dot to be printed is selected in such a manner, in each instance, that the angular difference between the rotational position of the trigger point of the print cycle and the rotational position in which the print dot to be printed is arranged with reference to the axis of rotation when the support is positioned at the trigger point relative to the emitter array is not greater, in terms of amount, than half the angular distance between the trigger points.

2. A method for producing at least one solid-body layer on a support that can be rotated about an axis of rotation-, in accordance with predetermined geometry data, a) wherein a container is provided, in which at least one material layer composed of a liquid, paste-like or powder-form material applied to a support wherein for irradiation of the material with radiation that solidifies the material, an emitter array having a number of N radiation emitters that are spaced apart from one another and face the material layer is provided, which emitters are arranged in matrix form, in emitter columns are offset parallel to one another, and emitter rows that are offset parallel to one another and run transverse to the emitter columns, wherein emitter columns are adjacent to one another in the circumferential direction of the axis of rotation are offset from one another in the expanse direction of the emitter columns, in each instance, in such a manner that the individual emitters of the emitter array are arranged at different radial distances DA(i) from the axis of rotation, wherein it holds true that:

$$DA(i) > DA(i+1)$$

where $j \in [M \ldots (M+N-1)]$ b) wherein print dots $(P_M \ldots P_{M+N})$ are assigned to the geometry data, which dots are offset from one another, in a matrix having multiple rows that run next to one another, in which a number of Q print dots are arranged, in each instance, in such a manner that the following holds true:

$$PA(j) > PA(j+1),$$

where $j \in [M \ldots (M+N-1)]$ and $1 \leq M \leq Q-N$, wherein PA(j) is the radial distance of the $j^{th}$ print dot $P_j$ of the row in question from the axis of rotation, and M is a whole number, c) wherein for print dots $P_k$ at which the solid-body layer is supposed to be present, radiation is emitted onto the material from the emitter $D_k$ of the emitter array assigned to the print dot $P_k$ in question, in each instance, wherein k is a whole number between M and M+N−1, d) wherein the irradiation of the material takes place in print cycles in which the emitter array is triggered once, in each instance, at a trigger point assigned to the print cycle in question, for irradiation, and the support as well as the emitter array are offset relative to one another, in each instance, from print cycle to print cycle, by an angular distance with reference to the axis of rotation, e) wherein printing of all the print dots $P_M \ldots P_{M+N-1}$ of a row that are to be printed takes place in a number of print cycles that is greater than the number of emitter columns, f) wherein the print cycle for each print dot to be printed is selected, in each instance, in such a manner that the angular difference between the rotational position of the trigger point of the print cycle and the rotational position in which the print dot to be printed is arranged with reference to the axis of rotation when the support is positioned at the trigger point relative to the emitter array is not greater, in terms of amount, than half the angular distance between the trigger points.

3. The method according to claim 1, wherein the matrix is a Cartesian matrix, and the rows in which the print dots are offset from one another run parallel to one another.

4. The method according to claim 1, wherein the matrix is a polar matrix, and the rows in which the dots are offset from one another are arranged radially relative to the axis of rotation, and that preferably, rows that are adjacent to one another are offset from one another, in each instance, at the angular distance of the trigger points.

5. The method according to claim 1, wherein for a number of trigger points that directly follow one another, corresponding to the number of print cycles, a print cycle is assigned for the trigger point in question, in each instance, for every print dot $P_M \ldots P_{M+N-1}$ that the emitter array is set up to print, to the print dot $P_M \ldots P_{M+N-1}$ in question, and that afterward, in accordance with this assignment, a print cycle is assigned, in each instance, for the individual rows, to each print dot $P_M \ldots P_{M+N-1}$ to be printed, which the emitter array is set up to print, and the emitter array is triggered, in each instance, when the trigger point that is assigned to the print cycle in question is reached.

6. The method according to claim 1, wherein a) a data memory is provided, in which the geometry data are stored, b) a ring memory is provided, which has at least a number of memory spaces that corresponds to the number of print cycles, which comprise, in each instance, a number of memory locations that corresponds to the number of the emitters of the emitter array, each of which locations is assigned to an emitter, in each instance, c) for a number of directly consecutive print cycles that corresponds to the number of print cycles, one of the memory spaces is assigned to each of these print cycles, in each instance, d) for a first row of print dots stored in the data memory, a number of print dots that the emitter array is set up to print, corresponding to the number of emitters of the emitter array, is read out of the data memory, e) for the emitters assigned to the print dots of the first row, an activation value is stored in the memory locations of the ring memory assigned to the emitters, in each instance, which value indicates whether the emitter assigned to the print dot in question is supposed to be activated in the print cycle assigned to the memory in question, f) for a further row of print dots stored in the data memory, a number of print dots that the emitter array is set up to print, which number corresponds to the number of the emitters of the emitter array, is read out from the data memory, g) for the print dots of the further row, an activation value is stored in the memory locations of the ring memory assigned to the emitters, which number corresponds to the number of emitters, and indicates whether the emitter assigned to the print dot in question is supposed to be activated in the print cycle assigned to the memory space in question, h) steps f) and g) are repeated until, for a number of rows that corresponds to the number of print cycles, in each instance, a number of print dots corresponding to the number of emitters, in each instance, has been read out of the data memory, and corresponding activation values have been stored in the ring memory for these print dots, i) the support and the emitter array are positioned relative to one another at the trigger point assigned to the print cycle, in the memory space of which activation values were last stored, and the emitters of the emitter array are controlled as a function of the activation values stored in this memory space, j) in the event that at least one further print dot is still supposed to be printed, the memory spaces are cyclically interchanged, in such a manner that the memory space to which the trigger point is assigned, at which the support and the emitter array were last positioned relative to one another for triggering the emitters, is the first memory space, and afterward steps f) to j) are repeated.

7. The method according to claim 1, wherein a print buffer is assigned to the emitter array, in which a memory location is provided, in each instance, for each emitter of the emitter array, that in every print cycle, in each instance, an activation signal is stored for each emitter, as a function of the geometry data, in the memory location of the print buffer assigned to the emitter in question, in each instance, and that the emitter array is afterward triggered in the print cycle, in such a manner that the individual emitters are controlled as a function of the activation signal stored in the memory location assigned to them.

8. The method according to claim 7, wherein for imprinting of printed rings that are arranged concentrically relative to the axis of rotation and delimited by means of an inner and an outer circular path, in each instance, at least a first and a second emitter array are provided, that these emitter arrays are positioned relative to the axis of rotation in such a manner that the arithmetical average value of the inner and the outer circular path of the first emitter array differs from the arithmetical average value of the inner and the outer circular path of the second emitter array, and that a different number M is assigned to the first emitter array than to the second emitter array.

9. The method according to claim 1, wherein the emitter columns of the emitter array are arranged symmetrically relative to a radial plane that passes through the axis of rotation and a normal line to the axis of rotation, in such a manner that the emitter columns run parallel to this radial plane.

10. The method according to claim 1, wherein at least two emitter arrays are provided, which are offset from one another, with reference to the axis of rotation, by a rotational angle, and that the emitters of the individual emitter arrays are controlled, in each instance, for applying material portions, in accordance with claim 1.

11. The method according to claim 1, wherein emitters that are adjacent to one another within the emitter columns are offset from one another at a constant first raster distance, that emitter columns that are adjacent to one another are offset from one another, in each instance, at a constant second raster distance, and that the first raster distance deviates by less than 20 percent, in particular by less than 10 percent, from the product of the number of the emitter columns and the second raster distance, and, in particular, agrees with this product.

12. The method according to claim 1, wherein for producing a three-dimensional shaped object, multiple material layers of the material that can pass through the nozzles are applied, one on top of the other, wherein the distance between the emitter array and the support, is increased, in each instance, from layer to layer, by the thickness of the material layer last applied, and each material layer is solidified after being applied, in each instance, before a further material layer is applied to this material layer.

13. The method according to claim 2, wherein for producing a three-dimensional shaped object, multiple material layers of the liquid, paste-like or powder-form material on top of one another are solidified by means of irradiation with the emitter array.

* * * * *

UNITED STATES PATENT AND TRADEMARK OFFICE
CERTIFICATE OF CORRECTION

PATENT NO. : 11,958,252 B2
APPLICATION NO. : 17/604235
DATED : April 16, 2024
INVENTOR(S) : Hans Mathea Page 1 of 2

It is certified that error appears in the above-identified patent and that said Letters Patent is hereby corrected as shown below:

In the Claims

Column 18, Line 36, Claim 1, delete "the" and insert -- a --

Column 18, Line 37, Claim 1, after "through" delete "the"

Column 18, Line 43, Claim 1, delete "the" and insert -- a --

Column 18, Line 46, Claim 1, delete "the" and insert -- an --

Column 18, Line 47, Claim 1, after "that" delete "the"

Column 18, Line 54, Claim 1, after "the" insert -- predetermined --

Column 19, Line 17, Claim 1, delete "the" and insert -- an --

Column 19, Line 18, Claim 1, delete "the" and insert -- a --

Column 19, Line 26, Claim 2, delete "rotation-," and insert -- rotation, --

Column 19, Line 30, Claim 2, after "material" insert -- is --

Column 19, Line 30, Claim 2, delete "support" and insert -- support, --

Column 19, Line 31, Claim 2, delete "material" and insert -- at least one material layer --

Column 19, Line 32, Claim 2, delete "material," and insert -- at least one material layer, --

Column 19, Line 34, Claim 2, after "the" insert -- at least one --

Signed and Sealed this
Third Day of September, 2024

Katherine Kelly Vidal
*Director of the United States Patent and Trademark Office*

CERTIFICATE OF CORRECTION (continued)
U.S. Pat. No. 11,958,252 B2

Column 19, Line 36, Claim 2, before "are" insert -- that --

Column 19, Line 39, Claim 2, before "are" insert -- that --

Column 19, Line 39, Claim 2, delete "the" and insert -- a --

Column 19, Line 41, Claim 2, delete "the" and insert -- an --

Column 19, Line 42, Claim 2, after "that" delete "the"

Column 19, Line 48, Claim 2, delete "$j \in [M \ldots (M+N-1)]$" and insert -- $i \in [1 \ldots (N-1)]$ --

Column 19, Line 49, Claim 2, after "the" insert -- predetermined --

Column 19, Line 62, Claim 2, after "the" insert -- at least one --

Column 20, Line 9, Claim 2, delete "$P_M+N-1$" and insert -- $P_{M+N-1}$ --

Column 20, Line 36, Claim 2, delete "$P_M+N-1$" and insert -- $P_{M+N-1}$ --

Column 20, Line 37, Claim 5, delete "$P_M+N-1$" and insert -- $P_{M+N-1}$ --

Column 20, Line 40, Claim 5, delete "$P_M+N-1$" and insert -- $P_{M+N-1}$ --

Column 20, Line 45, Claim 6, after "the" insert -- predetermined --

Column 21, Line 39, Claim 7, after "the" insert -- predetermined --